United States Patent
Gossain et al.

(10) Patent No.: US 11,816,390 B2
(45) Date of Patent: *Nov. 14, 2023

(54) PLAYBACK DEVICE USING STANDBY IN A MEDIA PLAYBACK SYSTEM

(71) Applicant: Sonos, Inc., Santa Barbara, CA (US)

(72) Inventors: Hrishikesh Gossain, Santa Barbara, CA (US); Benjamin Ari Tober, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/129,235

(22) Filed: Dec. 21, 2020

(65) Prior Publication Data

US 2021/0255822 A1 Aug. 19, 2021

Related U.S. Application Data

(63) Continuation of application No. 16/042,551, filed on Jul. 23, 2018, now Pat. No. 10,871,938, which is a
(Continued)

(51) Int. Cl.
*G06F 1/32* (2019.01)
*G06F 3/16* (2006.01)
(Continued)

(52) U.S. Cl.
CPC ............ *G06F 3/165* (2013.01); *G06F 1/26* (2013.01); *G06F 1/3206* (2013.01);
(Continued)

(58) Field of Classification Search
CPC .................................. G06F 1/26; G06F 1/32
See application file for complete search history.

(56) References Cited

U.S. PATENT DOCUMENTS 3,956,591 A 5/1976 Gates, Jr.
4,105,974 A 8/1978 Rogers
(Continued)

FOREIGN PATENT DOCUMENTS

CA 2320451 A1 3/2001
CN 1598767 A 3/2005
(Continued)

OTHER PUBLICATIONS

WANIPConnection:1 Service Template Version 1.01 for UPnP Ver. 1.0 (Nov. 12, 2001) (D+M_0401844-917) (74 pages).
(Continued)

*Primary Examiner* — Phil K Nguyen

(57) ABSTRACT

Example embodiments involve a standby mode of a playback device. An example implementation involves a first playback device receiving, while an audio processing component of the first playback device is in standby, a first packet over a network. The audio processing component consumes relatively less power in standby compared with not operating in standby. In response to receiving the first packet, the first playback device exits standby, and enters a non-standby mode. Entering the non-standby mode enables the audio processing component of the first playback device. The first playback device also broadcasts over the network a second packet comprising a payload that is associated with a destination address. After receiving the first packet, the first playback device forwards packets to a second playback device. Once the first playback device is no longer forwarding the packets, the first playback device enters standby.

20 Claims, 15 Drawing Sheets

Related U.S. Application Data continuation of application No. 14/950,233, filed on Nov. 24, 2015, now Pat. No. 10,031,716, which is a continuation of application No. 14/042,098, filed on Sep. 30, 2013, now Pat. No. 9,244,516.

(51) Int. Cl.
*G06F 1/3206* (2019.01)
*G06F 1/26* (2006.01)
*G06F 16/951* (2019.01)
*H04L 12/12* (2006.01)
*G06F 1/3209* (2019.01)
*H04L 101/622* (2022.01)

(52) U.S. Cl.
CPC .......... *G06F 1/3209* (2013.01); *G06F 16/951* (2019.01); *H04L 12/12* (2013.01); *H04L 2101/622* (2022.05); *Y02D 30/50* (2020.08)

(56) References Cited

U.S. PATENT DOCUMENTS

| | | |
|---|---|---|
| D260,764 S | 9/1981 | Castagna et al. |
| 4,296,278 A | 10/1981 | Cullison et al. |
| 4,306,114 A | 12/1981 | Callahan |
| 4,509,211 A | 4/1985 | Robbins |
| D279,779 S | 7/1985 | Taylor |
| 4,530,091 A | 7/1985 | Crockett |
| 4,701,629 A | 10/1987 | Citroen |
| 4,712,105 A | 12/1987 | Koehler |
| D293,671 S | 1/1988 | Beaumont |
| 4,731,814 A | 3/1988 | Becker et al. |
| 4,824,059 A | 4/1989 | Butler |
| D301,037 S | 5/1989 | Matsuda |
| 4,845,751 A | 7/1989 | Schwab |
| D304,443 S | 11/1989 | Grinyer et al. |
| D313,023 S | 12/1990 | Kolenda et al. |
| D313,398 S | 1/1991 | Gilchrist |
| D313,600 S | 1/1991 | Weber |
| 4,994,908 A | 2/1991 | Kuban et al. |
| D320,598 S | 10/1991 | Auerbach et al. |
| D322,609 S | 12/1991 | Patton |
| 5,086,385 A | 2/1992 | Launey et al. |
| D326,450 S | 5/1992 | Watanabe |
| D327,060 S | 6/1992 | Wachob et al. |
| 5,151,922 A | 9/1992 | Weiss |
| D331,388 S | 12/1992 | Dahnert et al. |
| 5,182,552 A | 1/1993 | Paynting |
| D333,135 S | 2/1993 | Wachob et al. |
| 5,237,327 A | 8/1993 | Saitoh et al. |
| 5,255,094 A | 10/1993 | Yong et al. |
| 5,272,757 A | 12/1993 | Scofield et al. |
| D350,531 S | 9/1994 | Tsuji |
| D350,962 S | 9/1994 | Reardon et al. |
| 5,361,381 A | 11/1994 | Short |
| 5,372,441 A | 12/1994 | Louis |
| D354,059 S | 1/1995 | Hendricks |
| D354,751 S | 1/1995 | Hersh et al. |
| D356,093 S | 3/1995 | McCauley et al. |
| D356,312 S | 3/1995 | Althans |
| D357,024 S | 4/1995 | Tokiyama et al. |
| 5,406,634 A | 4/1995 | Anderson et al. |
| 5,430,485 A | 7/1995 | Lankford et al. |
| 5,440,644 A | 8/1995 | Farinelli et al. |
| D362,446 S | 9/1995 | Gasiorek et al. |
| 5,457,448 A | 10/1995 | Totsuka et al. |
| D363,933 S | 11/1995 | Starck |
| D364,877 S | 12/1995 | Tokiyama et al. |
| D364,878 S | 12/1995 | Green et al. |
| D365,102 S | 12/1995 | Gioscia |
| D366,044 S | 1/1996 | Hara et al. |
| 5,481,251 A | 1/1996 | Buys et al. |
| 5,515,345 A | 5/1996 | Barreira et al. |
| D372,716 S | 8/1996 | Thorne |
| 5,553,314 A | 9/1996 | Grube et al. |
| D377,651 S | 1/1997 | Biasotti et al. |
| 5,625,350 A | 4/1997 | Fukatsu et al. |
| D379,816 S | 6/1997 | Laituri et al. |
| 5,640,388 A | 6/1997 | Woodhead et al. |
| D380,752 S | 7/1997 | Hanson |
| D382,271 S | 8/1997 | Akwiwu |
| 5,661,665 A | 8/1997 | Glass et al. |
| 5,668,884 A | 9/1997 | Clair, Jr. et al. |
| 5,673,323 A | 9/1997 | Schotz et al. |
| D384,940 S | 10/1997 | Kono et al. |
| D387,352 S | 12/1997 | Kaneko et al. |
| D388,792 S | 1/1998 | Nykerk |
| D389,143 S | 1/1998 | Wicks |
| D392,641 S | 3/1998 | Fenner |
| D393,628 S | 4/1998 | Ledbetter et al. |
| 5,740,235 A | 4/1998 | Lester et al. |
| 5,742,623 A | 4/1998 | Nuber et al. |
| D394,659 S | 5/1998 | Biasotti et al. |
| 5,761,320 A | 6/1998 | Farinelli et al. |
| 5,774,016 A | 6/1998 | Ketterer |
| D395,889 S | 7/1998 | Gerba et al. |
| 5,790,543 A | 8/1998 | Cloutier |
| D397,996 S | 9/1998 | Smith |
| 5,812,201 A | 9/1998 | Yoo |
| 5,818,948 A | 10/1998 | Gulick |
| 5,822,598 A | 10/1998 | Lam |
| D401,587 S | 11/1998 | Rudolph |
| 5,832,024 A | 11/1998 | Schotz et al. |
| 5,848,152 A | 12/1998 | Slipy et al. |
| 5,852,722 A | 12/1998 | Hamilton |
| D404,741 S | 1/1999 | Schumaker et al. |
| 5,857,115 A | 1/1999 | Tanaka |
| D405,071 S | 2/1999 | Gambaro |
| 5,875,233 A | 2/1999 | Cox |
| D406,847 S | 3/1999 | Gerba et al. |
| D407,071 S | 3/1999 | Keating |
| 5,900,026 A | 5/1999 | Ryu |
| 5,905,768 A | 5/1999 | Maturi et al. |
| D410,927 S | 6/1999 | Yamagishi |
| D412,337 S | 7/1999 | Hamano |
| 5,923,902 A | 7/1999 | Inagaki |
| 5,946,343 A | 8/1999 | Schotz et al. |
| 5,949,776 A | 9/1999 | Mahany et al. |
| 5,956,025 A | 9/1999 | Goulden et al. |
| 5,960,006 A | 9/1999 | Maturi et al. |
| D415,496 S | 10/1999 | Gerba et al. |
| D416,021 S | 11/1999 | Godette et al. |
| 5,984,512 A | 11/1999 | Jones et al. |
| 5,987,611 A | 11/1999 | Freund |
| 5,990,884 A | 11/1999 | Douma et al. |
| 5,991,307 A | 11/1999 | Komuro et al. |
| 5,999,906 A | 12/1999 | Mercs et al. |
| 6,018,376 A | 1/2000 | Nakatani |
| D420,006 S | 2/2000 | Tonino |
| 6,029,196 A | 2/2000 | Lenz |
| 6,032,202 A | 2/2000 | Lea et al. |
| 6,038,614 A | 3/2000 | Chan et al. |
| 6,046,550 A | 4/2000 | Ference et al. |
| 6,061,457 A | 5/2000 | Stockhamer |
| 6,081,266 A | 6/2000 | Sciammarella |
| 6,088,063 A | 7/2000 | Shiba |
| D429,246 S | 8/2000 | Holma |
| D430,143 S | 8/2000 | Renk |
| 6,101,195 A | 8/2000 | Lyons et al. |
| 6,122,749 A | 9/2000 | Gulick |
| D431,552 S | 10/2000 | Backs et al. |
| D432,525 S | 10/2000 | Beecroft |
| 6,127,941 A | 10/2000 | Van Ryzin |
| 6,148,205 A | 11/2000 | Cotton |
| 6,148,345 A | 11/2000 | Yamaki |
| 6,154,488 A | 11/2000 | Hunt |
| 6,157,726 A | 12/2000 | Carroll et al. |
| 6,169,725 B1 | 1/2001 | Gibbs et al. |
| 6,181,383 B1 | 1/2001 | Fox et al. |
| 6,195,435 B1 | 2/2001 | Kitamura |
| 6,212,282 B1 | 4/2001 | Mershon |
| 6,246,701 B1 | 6/2001 | Slattery |
| D444,475 S | 7/2001 | Levey et al. |
| 6,256,554 B1 | 7/2001 | DiLorenzo |

(56) References Cited

U.S. PATENT DOCUMENTS

| | | |
|---|---|---|
| 6,269,406 B1 | 7/2001 | Dutcher et al. |
| 6,295,356 B1 | 9/2001 | De |
| 6,301,012 B1 | 10/2001 | White et al. |
| 6,310,652 B1 | 10/2001 | Li et al. |
| 6,311,279 B1 | 10/2001 | Nguyen |
| 6,313,879 B1 | 11/2001 | Kubo et al. |
| 6,316,992 B1 | 11/2001 | Miao et al. |
| 6,317,789 B1 | 11/2001 | Rakavy et al. |
| 6,321,252 B1 | 11/2001 | Bhola et al. |
| D452,520 S | 12/2001 | Gotham et al. |
| 6,353,172 B1 | 3/2002 | Fay et al. |
| 6,356,871 B1 | 3/2002 | Hemkumar et al. |
| 6,359,872 B1 | 3/2002 | Mahany et al. |
| 6,366,582 B1 | 4/2002 | Nishikado et al. |
| 6,388,514 B1 | 5/2002 | King et al. |
| 6,404,811 B1 | 6/2002 | Cvetko et al. |
| 6,418,150 B1 | 7/2002 | Staats |
| 6,442,443 B1 | 8/2002 | Fujii et al. |
| D462,339 S | 9/2002 | Allen et al. |
| D462,340 S | 9/2002 | Allen et al. |
| D462,945 S | 9/2002 | Skulley |
| 6,449,642 B2 | 9/2002 | Bourke-Dunphy et al. |
| 6,456,783 B1 | 9/2002 | Ando et al. |
| 6,463,474 B1 | 10/2002 | Fuh et al. |
| 6,466,832 B1 | 10/2002 | Zuqert et al. |
| 6,469,633 B1 | 10/2002 | Wachter |
| D466,108 S | 11/2002 | Glodava et al. |
| 6,487,296 B1 | 11/2002 | Allen et al. |
| 6,493,824 B1 | 12/2002 | Novoa et al. |
| 6,493,832 B1 | 12/2002 | Itakura et al. |
| D468,297 S | 1/2003 | Keda |
| 6,522,886 B1 | 2/2003 | Youngs et al. |
| 6,535,121 B2 | 3/2003 | Mathney et al. |
| D474,763 S | 5/2003 | Tozaki et al. |
| D475,993 S | 6/2003 | Meyer |
| D476,643 S | 7/2003 | Yamagishi |
| D477,310 S | 7/2003 | Moransais |
| 6,590,982 B1 | 7/2003 | Chen |
| D478,051 S | 8/2003 | Sagawa |
| D478,069 S | 8/2003 | Beck et al. |
| D478,896 S | 8/2003 | Summers |
| 6,611,537 B1 | 8/2003 | Edens et al. |
| D479,520 S | 9/2003 | De |
| D481,056 S | 10/2003 | Kawasaki et al. |
| 6,631,410 B1 | 10/2003 | Kowalski et al. |
| 6,636,269 B1 | 10/2003 | Baldwin |
| 6,653,899 B2 | 11/2003 | Organvidez et al. |
| 6,654,720 B1 | 11/2003 | Graham et al. |
| 6,654,956 B1 | 11/2003 | Trinh et al. |
| 6,684,060 B1 | 1/2004 | Curtin |
| D486,145 S | 2/2004 | Kaminski et al. |
| 6,690,431 B1 | 2/2004 | Yang et al. |
| 6,704,421 B1 | 3/2004 | Kitamura |
| 6,741,961 B2 | 5/2004 | Im |
| D491,925 S | 6/2004 | Griesau et al. |
| 6,757,517 B2 | 6/2004 | Chang |
| D493,148 S | 7/2004 | Shibata et al. |
| D495,333 S | 8/2004 | Borsboom |
| 6,778,073 B2 | 8/2004 | Lutter et al. |
| 6,778,869 B2 | 8/2004 | Champion |
| D496,003 S | 9/2004 | Spira |
| D496,005 S | 9/2004 | Wang |
| D496,335 S | 9/2004 | Spira |
| D497,363 S | 10/2004 | Olson et al. |
| 6,804,351 B1 | 10/2004 | Karam |
| D499,086 S | 11/2004 | Polito |
| 6,816,510 B1 | 11/2004 | Banerjee |
| 6,826,283 B1 | 11/2004 | Wheeler et al. |
| D499,395 S | 12/2004 | Isu |
| D499,718 S | 12/2004 | Chen |
| D500,015 S | 12/2004 | Gubbe |
| D501,477 S | 2/2005 | Hall |
| 6,859,460 B1 | 2/2005 | Chen |
| 6,859,538 B1 | 2/2005 | Voltz |
| 6,873,862 B2 | 3/2005 | Reshefsky |
| D504,872 S | 5/2005 | Uehara et al. |
| D504,885 S | 5/2005 | Zhang et al. |
| 6,901,439 B1 | 5/2005 | Bonasia et al. |
| D506,463 S | 6/2005 | Daniels |
| 6,915,347 B2 | 7/2005 | Hanko et al. |
| 6,919,771 B2 | 7/2005 | Nakajima |
| 6,931,557 B2 | 8/2005 | Togawa |
| 6,937,988 B1 | 8/2005 | Hemkumar et al. |
| 6,970,940 B1 | 11/2005 | Vogel et al. |
| 6,975,211 B2 | 12/2005 | Atsuta et al. |
| 6,987,767 B2 | 1/2006 | Saito |
| D515,072 S | 2/2006 | Lee |
| D515,557 S | 2/2006 | Okuley |
| D518,475 S | 4/2006 | Yang et al. |
| 7,046,677 B2 | 5/2006 | Monta et al. |
| D524,296 S | 7/2006 | Kita |
| D527,375 S | 8/2006 | Flora et al. |
| 7,092,528 B2 | 8/2006 | Patrick et al. |
| 7,092,694 B2 | 8/2006 | Griep et al. |
| 7,096,169 B2 | 8/2006 | Crutchfield et al. |
| 7,120,168 B2 | 10/2006 | Zimmermann |
| 7,126,945 B2 | 10/2006 | Beach |
| 7,130,316 B2 | 10/2006 | Kovacevic |
| 7,130,608 B2 | 10/2006 | Hollstrom et al. |
| 7,130,616 B2 | 10/2006 | Janik |
| 7,136,934 B2 | 11/2006 | Carter et al. |
| 7,139,981 B2 | 11/2006 | Mayer et al. |
| 7,143,939 B2 | 12/2006 | Henzerling |
| 7,146,260 B2 | 12/2006 | Preston et al. |
| 7,161,939 B2 | 1/2007 | Israel et al. |
| 7,196,584 B2 | 3/2007 | Harris |
| 7,197,148 B2 | 3/2007 | Nourse et al. |
| 7,206,618 B2 | 4/2007 | Latto et al. |
| 7,236,461 B1 | 6/2007 | Sonti et al. |
| 7,236,773 B2 | 6/2007 | Thomas |
| 7,260,616 B1 | 8/2007 | Cook |
| 7,263,110 B2 | 8/2007 | Fujishiro |
| 7,277,547 B1 | 10/2007 | Delker et al. |
| 7,289,631 B2 | 10/2007 | Ishidoshiro |
| 7,295,548 B2 | 11/2007 | Blank et al. |
| 7,305,694 B2 | 12/2007 | Commons et al. |
| 7,308,188 B2 | 12/2007 | Namatame |
| 7,324,857 B2 | 1/2008 | Goddard |
| 7,356,011 B1 | 4/2008 | Waters et al. |
| 7,366,206 B2 | 4/2008 | Lockridge et al. |
| 7,378,903 B2 | 5/2008 | Bates et al. |
| 7,391,791 B2 | 6/2008 | Balassanian et al. |
| 7,428,310 B2 | 9/2008 | Park |
| 7,430,181 B1 | 9/2008 | Hong |
| 7,457,948 B1 | 11/2008 | Bilicksa et al. |
| 7,472,058 B2 | 12/2008 | Tseng et al. |
| 7,483,538 B2 | 1/2009 | McCarty et al. |
| 7,492,912 B2 | 2/2009 | Chung et al. |
| 7,505,889 B2 | 3/2009 | Salmonsen et al. |
| 7,548,744 B2 | 6/2009 | Oesterling et al. |
| 7,548,851 B1 | 6/2009 | Lau et al. |
| 7,558,224 B1 | 7/2009 | Surazski et al. |
| 7,558,635 B1 | 7/2009 | Thiel et al. |
| 7,571,014 B1 | 8/2009 | Lambourne et al. |
| 7,627,825 B2 | 12/2009 | Kakuda |
| 7,630,501 B2 | 12/2009 | Blank et al. |
| 7,643,894 B2 | 1/2010 | Braithwaite et al. |
| 7,653,344 B1 | 1/2010 | Feldman et al. |
| 7,657,910 B1 | 2/2010 | McAulay et al. |
| 7,668,925 B1 | 2/2010 | Liao et al. |
| 7,672,463 B2 | 3/2010 | Park et al. |
| 7,675,943 B2 | 3/2010 | Mosig et al. |
| 7,676,044 B2 | 3/2010 | Sasaki et al. |
| 7,676,142 B1 | 3/2010 | Hung |
| 7,688,306 B2 | 3/2010 | Wehrenberg et al. |
| 7,696,816 B2 | 4/2010 | Bates |
| 7,710,941 B2 | 5/2010 | Rietschel et al. |
| 7,721,032 B2 | 5/2010 | Bushell et al. |
| 7,743,197 B2 | 6/2010 | Chavan et al. |
| 7,746,906 B2 | 6/2010 | Jinzaki et al. |
| 7,761,176 B2 | 7/2010 | Ben-Yaacov et al. |
| 7,831,054 B2 | 11/2010 | Ball et al. |
| 7,853,341 B2 | 12/2010 | McCarty et al. |
| 7,881,755 B1 | 2/2011 | Mishra et al. |

(56) References Cited

U.S. PATENT DOCUMENTS

| | | | |
|---|---|---|---|
| 7,882,234 B2 | 2/2011 | Watanabe et al. | |
| 7,933,418 B2 | 4/2011 | Morishima | |
| 7,945,636 B2 | 5/2011 | Nelson et al. | |
| 7,945,708 B2 | 5/2011 | Ohkita | |
| 7,966,388 B1 | 6/2011 | Pugaczewski et al. | |
| 7,987,294 B2 | 7/2011 | Bryce et al. | |
| 7,995,732 B2 | 8/2011 | Koch et al. | |
| 8,014,423 B2 | 9/2011 | Thaler et al. | |
| 8,024,055 B1* | 9/2011 | Holmgren | G06F 1/3246 700/94 |
| 8,041,062 B2 | 10/2011 | Cohen et al. | |
| 8,045,952 B2 | 10/2011 | Qureshey et al. | |
| 8,050,203 B2 | 11/2011 | Jacobsen et al. | |
| 8,103,009 B2 | 1/2012 | McCarty et al. | |
| 8,150,079 B2 | 4/2012 | Maeda et al. | |
| 8,156,360 B2 | 4/2012 | Paljug | |
| 8,170,222 B2 | 5/2012 | Dunko | |
| 8,189,816 B2 | 5/2012 | Solow | |
| 8,233,029 B2 | 7/2012 | Yoshida et al. | |
| 8,234,395 B2 | 7/2012 | Millington | |
| 8,311,226 B2 | 11/2012 | Lorgeoux et al. | |
| 8,374,595 B2 | 2/2013 | Chien et al. | |
| 8,411,883 B2 | 4/2013 | Matsumoto | |
| 8,442,239 B2 | 5/2013 | Bruelle-Drews et al. | |
| 8,477,958 B2 | 7/2013 | Moeller et al. | |
| 8,483,853 B1 | 7/2013 | Lambourne | |
| 8,565,455 B2 | 10/2013 | Worrell et al. | |
| 8,600,084 B1 | 12/2013 | Garrett | |
| 8,654,995 B2 | 2/2014 | Silber et al. | |
| 8,843,224 B2 | 9/2014 | Holmgren et al. | |
| 8,861,739 B2 | 10/2014 | Ojanpera | |
| 8,942,252 B2 | 1/2015 | Balassanian et al. | |
| 8,942,395 B2 | 1/2015 | Lissaman et al. | |
| 9,179,197 B2 | 11/2015 | Beckhardt et al. | |
| 9,246,442 B2 | 1/2016 | Holmgren et al. | |
| 9,252,721 B2 | 2/2016 | Holmgren et al. | |
| 9,319,225 B2 | 4/2016 | Garg et al. | |
| 9,521,074 B2 | 12/2016 | Peters et al. | |
| 2001/0042107 A1 | 11/2001 | Palm | |
| 2001/0043456 A1 | 11/2001 | Atkinson | |
| 2001/0050991 A1 | 12/2001 | Eves | |
| 2002/0022453 A1 | 2/2002 | Balog et al. | |
| 2002/0026442 A1 | 2/2002 | Lipscomb et al. | |
| 2002/0072816 A1 | 6/2002 | Shdema et al. | |
| 2002/0072817 A1 | 6/2002 | Champion | |
| 2002/0078293 A1 | 6/2002 | Kou et al. | |
| 2002/0083172 A1 | 6/2002 | Knowles et al. | |
| 2002/0083342 A1 | 6/2002 | Webb et al. | |
| 2002/0083351 A1 | 6/2002 | Brabenac | |
| 2002/0101357 A1 | 8/2002 | Gharapetian | |
| 2002/0101651 A1 | 8/2002 | Dugan et al. | |
| 2002/0112084 A1 | 8/2002 | Deen et al. | |
| 2002/0124097 A1 | 9/2002 | Isely et al. | |
| 2002/0131761 A1 | 9/2002 | Kawasaki et al. | |
| 2002/0137505 A1 | 9/2002 | Eiche et al. | |
| 2002/0165921 A1 | 11/2002 | Sapieyevski | |
| 2003/0014486 A1 | 1/2003 | May | |
| 2003/0023411 A1 | 1/2003 | Witmer et al. | |
| 2003/0043856 A1 | 3/2003 | Lakaniemi et al. | |
| 2003/0046703 A1 | 3/2003 | Knowles et al. | |
| 2003/0063755 A1 | 4/2003 | Nourse et al. | |
| 2003/0103088 A1 | 6/2003 | Dresti et al. | |
| 2003/0157951 A1 | 8/2003 | Hasty, Jr. | |
| 2003/0167335 A1 | 9/2003 | Alexander | |
| 2003/0179780 A1 | 9/2003 | Walker et al. | |
| 2003/0185400 A1 | 10/2003 | Yoshizawa et al. | |
| 2003/0198257 A1 | 10/2003 | Sullivan et al. | |
| 2003/0210796 A1 | 11/2003 | McCarty et al. | |
| 2003/0212802 A1 | 11/2003 | Rector et al. | |
| 2003/0219007 A1 | 11/2003 | Barrack et al. | |
| 2003/0231208 A1 | 12/2003 | Hanon et al. | |
| 2004/0001591 A1 | 1/2004 | Mani et al. | |
| 2004/0014426 A1 | 1/2004 | Moore | |
| 2004/0019807 A1 | 1/2004 | Freund et al. | |
| 2004/0024478 A1 | 2/2004 | Hans et al. | |
| 2004/0037433 A1 | 2/2004 | Chen | |
| 2004/0042629 A1 | 3/2004 | Mellone et al. | |
| 2004/0049483 A1 | 3/2004 | Dewilde | |
| 2004/0059842 A1 | 3/2004 | Hanson et al. | |
| 2004/0117462 A1 | 6/2004 | Bodin et al. | |
| 2004/0168081 A1 | 8/2004 | Ladas et al. | |
| 2004/0171346 A1 | 9/2004 | Lin | |
| 2004/0177167 A1 | 9/2004 | Iwamura et al. | |
| 2004/0183827 A1 | 9/2004 | Putterman et al. | |
| 2004/0185773 A1 | 9/2004 | Gerber et al. | |
| 2004/0203590 A1 | 10/2004 | Shteyn | |
| 2004/0223622 A1 | 11/2004 | Lindemann et al. | |
| 2004/0249490 A1 | 12/2004 | Sakai | |
| 2004/0253969 A1 | 12/2004 | Nguyen et al. | |
| 2005/0044430 A1 | 2/2005 | Cheshire | |
| 2005/0060435 A1 | 3/2005 | Xue et al. | |
| 2005/0131558 A1 | 6/2005 | Braithwaite et al. | |
| 2005/0135304 A1 | 6/2005 | Wentink et al. | |
| 2005/0154766 A1 | 7/2005 | Huang et al. | |
| 2005/0160270 A1 | 7/2005 | Goldberg et al. | |
| 2005/0177256 A1 | 8/2005 | Shintani et al. | |
| 2005/0197725 A1 | 9/2005 | Alexander et al. | |
| 2005/0198219 A1 | 9/2005 | Banerjee et al. | |
| 2005/0265487 A1* | 12/2005 | Sou | H03L 7/091 375/326 |
| 2006/0002681 A1* | 1/2006 | Spilo | H04N 21/4305 386/220 |
| 2006/0072489 A1 | 4/2006 | Toyoshima | |
| 2006/0158168 A1 | 7/2006 | Yoshida et al. | |
| 2006/0173844 A1 | 8/2006 | Zhang et al. | |
| 2006/0209785 A1 | 9/2006 | Iovanna et al. | |
| 2006/0209892 A1 | 9/2006 | MacMullan et al. | |
| 2006/0222186 A1 | 10/2006 | Paige et al. | |
| 2006/0227985 A1 | 10/2006 | Kawanami | |
| 2006/0259649 A1 | 11/2006 | Hsieh et al. | |
| 2006/0270395 A1 | 11/2006 | Dhawan et al. | |
| 2007/0087686 A1 | 4/2007 | Holm et al. | |
| 2007/0142944 A1 | 6/2007 | Goldberg et al. | |
| 2007/0233835 A1* | 10/2007 | Kushalnagar | H04W 40/005 709/223 |
| 2008/0075295 A1 | 3/2008 | Mayman et al. | |
| 2008/0089338 A1 | 4/2008 | Campbell et al. | |
| 2008/0170511 A1 | 7/2008 | Shorty et al. | |
| 2008/0205070 A1 | 8/2008 | Osada | |
| 2008/0234012 A1 | 9/2008 | Liu et al. | |
| 2008/0303947 A1 | 12/2008 | Ohnishi et al. | |
| 2009/0011798 A1 | 1/2009 | Yamada | |
| 2009/0070434 A1 | 3/2009 | Himmelstein | |
| 2009/0122737 A1 | 5/2009 | Twitchell, Jr. | |
| 2009/0124289 A1 | 5/2009 | Nishida | |
| 2009/0133040 A1 | 5/2009 | Stevens, IV | |
| 2009/0138484 A1 | 5/2009 | Ramos et al. | |
| 2010/0009725 A1* | 1/2010 | Banerjea | H04W 72/12 455/574 |
| 2010/0087089 A1 | 4/2010 | Struthers et al. | |
| 2010/0171587 A1 | 7/2010 | Yoon et al. | |
| 2010/0216524 A1 | 8/2010 | Thomas et al. | |
| 2010/0232771 A1* | 9/2010 | Prestenback | H04N 5/765 386/201 |
| 2010/0289546 A1 | 11/2010 | Dooper et al. | |
| 2011/0001632 A1 | 1/2011 | Hohorst | |
| 2011/0299696 A1 | 12/2011 | Holmgren et al. | |
| 2011/0316768 A1 | 12/2011 | Mcrae | |
| 2012/0051567 A1 | 3/2012 | Castor-Perry | |
| 2012/0120958 A1 | 5/2012 | Mahadevan et al. | |
| 2012/0137146 A1 | 5/2012 | Karanth et al. | |
| 2012/0237059 A1 | 9/2012 | Saito | |
| 2012/0320793 A1 | 12/2012 | Balbierer et al. | |
| 2013/0114847 A1 | 5/2013 | Petrovic et al. | |
| 2014/0146832 A1 | 5/2014 | Pohlmann | |
| 2015/0365987 A1 | 12/2015 | Weel | |

FOREIGN PATENT DOCUMENTS

| | | |
|---|---|---|
| EP | 1312188 A1 | 5/2003 |
| EP | 1389853 A1 | 2/2004 |
| EP | 1517464 A2 | 3/2005 |
| EP | 1416687 B1 | 8/2006 |

(56) References Cited

FOREIGN PATENT DOCUMENTS

| | | |
|---|---|---|
| EP | 1410686 | 3/2008 |
| EP | 0742674 B1 | 4/2014 |
| GB | 2379533 A | 3/2003 |
| JP | 63269633 | 11/1988 |
| JP | 2000149391 A | 5/2000 |
| TW | 439027 | 6/2001 |
| WO | 1999023560 | 5/1999 |
| WO | 0019693 A1 | 4/2000 |
| WO | 200153994 | 7/2001 |
| WO | 2003093950 A2 | 11/2003 |
| WO | 2007135581 A2 | 11/2007 |
| WO | 2008082350 A1 | 7/2008 |
| WO | 2009038687 A2 | 3/2009 |

OTHER PUBLICATIONS

WANPPPConnection:1 Service Template Version 1.01 for UPnP, Version 1.0 (Nov. 12, 2001) (D+M_0401918-2006) (89 pages).
WaveLan High-Speed Multimode Chip Set, AVAGO0003, Agere Systems, Feb. 2003, 4 pages.
WaveLan High-Speed Multimode Chip Set, AVAGO0005, Agere Systems, Feb. 2003, 4 pages.
WaveLAN Wireless Integration Developer Kit (WI-DK) for Access Point Developers, AVAGO0054, Agere Systems, Jul. 2003, 2 pages.
WaveLAN Wireless Integration-Developer Kit (WI-DK) Hardware Control Function (HCF), AVAGO0052, Agere Systems, Jul. 2003, 2 pages.
WI-DK Release 2 WaveLan Embedded Drivers for VxWorks and Linux, AVAGO0056, Agere Systems, Jul. 2003, 2 pages.
WI-DK Release 2 WaveLan END Reference Driver for VxWorks, AVAGO0044, Agere Systems, Jul. 2003, 4 pages.
WI-DK Release 2 WaveLan LKM Reference Drivers for Linux, AVAGO0048, Agere Systems, Jul. 2003, 4 pages.
Windows Media Connect Device Compatibility Specification (Apr. 12, 2004) (16 pages).
Wireless Home Audio Director. Wireless N Music Player with Integrated Amplifier DMC250. Datasheet. Linksys by Cisco. Fill Your Home with Music, 2008, 2 pages.
WPA Reauthentication Rates, AVAGO0063, Agere Systems, Feb. 2004, 3 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
"Systemline Modular Installation Guide, Multiroom System," Systemline, 2003, pp. 1-22.
"ZR-8630AV MultiZone Audio/Video Receiver, Installation and Operation Guide," Niles Audio Corporation, 2003, 86 pages.
ZX135: Installation Manual,LA Audio, Apr. 2003, 44 pages.
Final Office Action dated Sep. 5, 2008, issued in connection with U.S. Appl. No. 10/845,805, filed May 15, 2004, 17 pages.
Final Office Action dated Nov. 13, 2017, issued in connection with U.S. Appl. No. 14/950,233, filed Nov. 24, 2015, 14 pages.
Final Office Action dated Nov. 15, 2007, issued in connection with U.S. Appl. No. 10/845,805, filed May 15, 2004, 15 pages.
Final Office Action dated Jan. 29, 2014, issued in connection with U.S. Appl. No. 13/212,889, filed Aug. 18, 2011, 13 pages.
FireBall Digital Music Manager E-40 and E-120. Meet FireBall. The Industry's choice for managing your entire music collection. Datasheet. 2003, 2 pages.
Fireball DVD and Music Manager DVDM-100 Installation and User's Guide, Copyright 2003, 185 pages.
Fireball E2 User's Manual. Escient. Gracenote cddb. 2000-2004, 106 pages.
Fireball MP-200 User's Manual, Copyright 2006, 93 pages.
Fireball Remote Control Guide WD006-1-1, Copyright 2003, 19 pages.
Fireball SE-D1 User's Manual, Copyright 2005, 90 pages.
Fober et al., "Clock Skew Compensation over a High Latency Network," Proceedings of the ICMC, 2002, pp. 548-552.
Gaston et al., "Methods for Sharing Stereo and Multichannel Recordings Among Planetariums," Audio Engineering Society Convention Paper 7474, 2008, 15 pages.
General Event Notification Architecture Base: Client to Arbiter (Apr. 2000) (23 pages).
Herre et al., "The Reference Model Architecture for MPEG Spatial Audio Coding," Audio Engineering Society Convention Paper (Presented at the 118th Convention), May 28-31, 2005, 13 pages.
Home Networking with Universal Plug and Play, IEEE Communications Magazine, vol. 39 No. 12 (Dec. 2001) (D+M_0402025-40) (16 pages).
"Home Theater Control Systems," Cinema Source, 2002, 19 pages.
IBM Home Director Installation and Service Manual, Copyright1998, 124 pages.
IBM Home Director Owner's Manual, Copyright 1999, 67 pages.
Integra Audio Network Receiver NAC 2.3 Instruction Manual, 68 pages.
Integra Audio Network Server NAS 2.3 Instruction Manual, pp. 1-32.
Integra Service Manual, Audio Network Receiver Model NAC-2.3, Dec. 2002, 44 pages.
Intel Designing a UPnP AV Media Renderer, v. 1.0 ("Intel AV Media Renderer") (May 20, 2003) (SONDM000115117-62) (46 pages).
Intel Media Renderer Device Interface ("Intel Media Renderer") (Sep. 6, 2002) (62 pages).
Intel SDK for UPnP Devices Programming Guide, Version 1.2.1, (Nov. 2002) (30 pages).
Ishibashi et al., "A Comparison of Media Synchronization Quality Among Reactive Control Schemes," IEEE Infocom, 2001, pp. 77-84.
Issues with Mixed IEEE 802.b/802.11g Networks, AVAGO0058, Agere Systems, Feb. 2004, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Kim et al., "Optimal Anycast Technique for Delay-Sensitive Energy-Constrained Asynchronous Sensor Networks," 23 pages, Apr. 2011.
LA Audio ZX135E 6 Zone Expander. Pro Audio Design Pro. Inc. https://www.proaudiodesign.com/products/la-audio-zx135e-6-zone-expander, accessed Mar. 26, 2020, 6 pages.
Lake Processors: Lake® LM Series Digital Audio Processors Operation Manual, 2011, 71 pages.
Levi et al., Request for Comments 4318, Definitions of Managed Objects for Bridges with Rapid Spanning Tree Protocol, Dec. 2005, 14 pages.
LG Musicflow, http://www.lg.com/uk/musicflow/av/MusicFlow_faq#a4, "LG Hi-Fi Audio", Sep. 20, 2015, 22 pages.
LG: RJP-201M Remote Jack Pack Installation and Setup Guide, 2010, 24 pages.
Lienhart et al., "On the Importance of Exact Synchronization for Distributed Audio Signal Processing," Session L: Poster Session II—ICASSP'03 Papers, 2002, 1 page.
LinkSys by Cisco, Wireless Home Audio Controller, Wireless-N Touchscreen Remote DMRW1000 Datasheet, Copyright 2008, 2 pages.
LinkSys by Cisco, Wireless Home Audio Controller, Wireless-N Touchscreen Remote DMRW1000 User Guide, Copyright 2008, 64 pages.
LinkSys by Cisco, Wireless Home Audio Player, Wireless-N Music Extender DMP100 Quick Installation Guide, Copyright 2009, 32 pages.
LinkSys by Cisco, Wireless Home Audio Player, Wireless-N Music Extender DMP100 User Guide, Copyright 2008, 65 pages.
Linux SDK for UPnP Devices v. 1.2 (Sep. 6, 2002) (101 pages).

(56) References Cited

OTHER PUBLICATIONS

Liu et al., "A synchronization control scheme for real-time streaming multimedia applications," Packet Video, 2003, 10 pages, vol. 2003.
Liu et al., "Adaptive Delay Concealment for Internet Voice Applications with Packet-Based Time-Scale Modification," Information Technologies 2000, pp. 91-102.
Louderback, Jim, "Affordable Audio Receiver Furnishes Homes With MP3," TechTV Vault. Jun. 28, 2000 retrieved Jul. 10, 2014, 2 pages.
MediaRenderer:1 Device Template Version 1.01 for UPnP, Version 1.0 (Jun. 25, 2002) (12 pages).
MediaServer:1 Device Template Version 1.01 for UPnP, Version 1.0 (Jun. 25, 2002) (12 pages).
Microsoft, Universal Plug and Play (UPnP) Client Support ("Microsoft UPnP") (Aug. 2001) (D+M_0402007-24) (18 pages).
Microsoft Window's XP Reviewer's Guide (Aug. 2001) (D+M_0402225-85) (61 pages).
"Model MRC44 Four Zone—Four Source Audio/Video Controller/Amplifier System," Xantech Corporation, 2002, 52 pages.
Model MRC88 Eight Zone—Eight Source Audio/Video Controller/Amplifier System, Xantech Corporation, 2003, 102 pages.
Multi-Zone Control Systems. ZR-8630AV MultiZone Receiver. Niles. http://www.ampersandcom.com/zr8630av.html accessed Mar. 26, 2020, 5 pages.
Sonos, Inc. v D&M Holdings, D&M Supp Opposition Brief including Exhibits, Mar. 17, 2017, 23 pages.
Sonos, Inc. v. D&M Holdings, Expert Report of Jay P. Kesan including Appendices A-P, Feb. 20, 2017, 776 pages.
Sonos, Inc. v. D&M Holdings Inc. et al., Complaint for Patent Infringement, filed Oct. 21, 2014, 20 pages.
Sonos, Inc. v. D&M Holdings Inc. et al., Defendant's Amended Invalidity Contentions, filed Sep. 14, 2016, 100 pages.
Sonos, Inc. v. D&M Holdings Inc. et al., Defendant's Initial Invalidity Contentions, filed Apr. 15, 2016, 97 pages.
Sonos, Inc. v. D&M Holdings Inc. et al., Defendant's Preliminary Identification of Indefinite Terms, provided Jul. 29, 2016, 8 pages.
Sonos, Inc. v. D&M Holdings Inc. et al., Defendants' Amended Answer, Defenses, and Counterclaims for Patent Infringement, filed Nov. 30, 2015, 47 pages.
Sonos, Inc. v. D&M Holdings Inc. et al., Defendants' Answer to Plaintiff's Second Amended Complaint, filed Apr. 30, 2015, 19 pages.
Sonos, Inc. v. D&M Holdings Inc. et al., Defendants' First Amended Answer to Plaintiffs' Third Amended Complaint, filed Sep. 7, 2016, 23 pages.
Sonos, Inc. v. D&M Holdings Inc. et al., Defendants' Reply in Support of Partial Motion for Judgment on the Pleadings, filed Jun. 10, 2016, 15 pages.
Sonos, Inc. v. D&M Holdings Inc. et al., Exhibit A: Defendants' First Amended Answer to Plaintiffs' Third Amended Complaint, provided Aug. 1, 2016, 26 pages.
Sonos, Inc. v. D&M Holdings Inc. et al., Exhibit A: Defendants' Second Amended Answer to Plaintiffs' Third Amended Complaint, filed Sep. 9, 2016, 43 pages.
Sonos, Inc. v. D&M Holdings Inc. et al., Exhibit A: Defendants' Second Amended Answer to Plaintiffs' Third Amended Complaint, provided Sep. 9, 2016, 88 pages.
Sonos, Inc. v. D&M Holdings Inc. et al., First Amended Complaint for Patent Infringement, filed Dec. 17, 2014, 26 pages.
Sonos, Inc. v. D&M Holdings Inc. et al., Joint Claim Construction Chart, vol. 1 of 3 with Exhibits A-O, filed Aug. 17, 2016, 30 pages.
Sonos, Inc. v. D&M Holdings Inc. et al., Opening Brief in Support of Defendants' Partial Motion for Judgment on the Pleadings for Lack of Patent-Eligible Subject Matter, filed May 6, 2016, 27 pages.
Sonos, Inc. v. D&M Holdings Inc. et al., Plaintiff Sonos, Inc.'s Opening Claim Construction Brief, filed Sep. 9, 2016, 26 pages.
Sonos, Inc. v. D&M Holdings Inc. et al., Plaintiff Sonos, Inc.'s Response in Opposition to Defendants' Partial Motion for Judgment on the Pleadings, filed May 27, 2016, 24 pages.

Sonos, Inc. v. D&M Holdings Inc. et al., Reply Brief in Support of Defendants' Motion for Leave to Amend their Answer to Add the Defense of Inequitable Conduct, provided Nov. 10, 2016, 16 pages.
Sonos, Inc. v. D&M Holdings Inc. et al., Reply Brief in Support of Defendants' Motion for Leave to Amend their Answer to Add the Defense of Inequitable Conduct, provided Sep. 9, 2016, 16 pages.
Sonos, Inc. v. D&M Holdings Inc. et al., Second Amended Complaint for Patent Infringement, filed Feb. 27, 2015, 19 pages.
Sonos, Inc. v. D&M Holdings Inc. et al., Sonos's Motion to Strike Defendants' New Amended Answer Submitted with their Reply Brief, provided Sep. 15, 2016, 10 pages.
Sonos, Inc. v. D&M Holdings Inc. et al., Sonos's Opposition to Defendants' Motion for Leave to Amend their Answer to Add the Defense of Inequitable Conduct, provided Oct. 31, 2016, 26 pages.
Sonos, Inc. v. D&M Holdings Inc. et al., Third Amended Complaint for Patent Infringement, filed Jan. 29, 2016, 47 pages.
Sonos, Inc. v. D&M Holdings Inc. (No. 14-1330-RGA), Defendants' Final Invalidity Contentions (Jan. 18, 2017) (106 pages).
Sonos, Inc. v. D&M Holdings (No. 14-1330-RGA), DI 226, Opinion Denying Inequitable Conduct Defenses, Feb. 6, 2017, updated, 5 pages.
Sonos, Inc. v. D&M Holdings (No. 14-1330-RGA), DI 242, US District Judge Andrews 101 Opinion, Mar. 13, 2017, 16 pages.
Sonos, Inc. v D&M Holdings Sonos Supp Opening Markman Brief including Exhibits, Mar. 3, 2017, 17 pages.
Sonos, Inc. v. D&M Holdings Sonos Supp Reply Markman Brief including Exhibits, Mar. 29, 2017, 36 pages.
Sonos, Inc. v. D&M Holdings Inc. et al., Declaration of Steven C. Visser, executed Sep. 9, 2016, 40 pages.
Sonos, Inc. v. D&M Holdings Inc. et al., Defendant's Amended Invalidity Contentions Exhibit 1: Defendants' Invalidity Contentions for U.S. Pat. No. 7,571,014 filed Sep. 16, 2016, 270 pages.
Sonos, Inc. v. D&M Holdings Inc. et al., Defendant's Amended Invalidity Contentions Exhibit 10: Defendants' Invalidity Contentions for U.S. Pat. No. 9,219,959 filed Sep. 27, 2016, 236 pages.
Sonos, Inc. v. D&M Holdings Inc. et al., Defendant's Amended Invalidity Contentions Exhibit 11: Defendants' Invalidity Contentions for U.S. Design Patent No. D559,197 filed Sep. 27, 2016, 52 pages.
Sonos, Inc. v. D&M Holdings Inc. et al., Defendant's Amended Invalidity Contentions Exhibit 2: Defendants' Invalidity Contentions for U.S. Pat. No. 8,588,949 filed Sep. 27, 2016, 224 pages.
Sonos, Inc. v. D&M Holdings Inc. et al., Defendant's Amended Invalidity Contentions Exhibit 3: Defendants' Invalidity Contentions for U.S. Pat. No. 8,843,224 filed Sep. 27, 2016, 147 pages.
Sonos, Inc. v. D&M Holdings Inc. et al., Defendant's Amended Invalidity Contentions Exhibit 4: Defendants' Invalidity Contentions for U.S. Pat. No. 8,938,312 filed Sep. 27, 2016, 229 pages.
Sonos, Inc. v. D&M Holdings Inc. et al., Defendant's Amended Invalidity Contentions Exhibit 5: Defendants' Invalidity Contentions for U.S. Pat. No. 8,938,637 filed Sep. 27, 2016, 213 pages.
Sonos, Inc. v. D&M Holdings Inc. et al., Defendant's Amended Invalidity Contentions Exhibit 6: Defendants' Invalidity Contentions for U.S. Pat. No. 9,042,556 filed Sep. 27, 2016, 162 pages.
Sonos, Inc. v. D&M Holdings Inc. et al., Defendant's Amended Invalidity Contentions Exhibit 7: Defendants' Invalidity Contentions for U.S. Pat. No. 9,195,258 filed Sep. 27, 2016, 418 pages.
Sonos, Inc. v. D&M Holdings Inc. et al., Defendant's Amended Invalidity Contentions Exhibit 8: Defendants' Invalidity Contentions for U.S. Pat. No. 9,202,509 filed Sep. 27, 2016, 331 pages.
Sonos, Inc. v. D&M Holdings Inc. et al., Defendant's Amended Invalidity Contentions Exhibit 9: Defendants' Invalidity Contentions for U.S. Pat. No. 9,213,357 filed Sep. 27, 2016, 251 pages.
Sonos, Inc. v. D&M Holdings Inc. et al., Defendant's Initial Invalidity Contentions Exhibit 1: Defendants' Invalidity Contentions for U.S. Pat. No. 7,571,014 filed Apr. 15, 2016, 161 pages.
Sonos, Inc. v. D&M Holdings Inc. et al., Defendant's Initial Invalidity Contentions Exhibit 10: Defendants' Invalidity Contentions for U.S. Pat. No. 9,213,357 filed Apr. 15, 2016, 244 pages.
Sonos, Inc. v. D&M Holdings Inc. et al., Defendant's Initial Invalidity Contentions Exhibit 11: Defendants' Invalidity Contentions for U.S. Pat. No. 9,219,959 filed Apr. 15, 2016, 172 pages.

(56) References Cited

OTHER PUBLICATIONS

*Sonos, Inc.* v. *D&M Holdings Inc. et al.,* Defendant's Initial Invalidity Contentions Exhibit 12: Defendants' Invalidity Contentions for U.S. Design Patent No. D559,197 filed Apr. 15, 2016, 36 pages.
*Sonos, Inc.* v. *D&M Holdings Inc. et al.,* Defendant's Initial Invalidity Contentions Exhibit 2: Defendants' Invalidity Contentions for U.S. Pat. No. 8,588,949 filed Apr. 15, 2016, 112 pages.
*Sonos, Inc.* v. *D&M Holdings Inc. et al.,* Defendant's Initial Invalidity Contentions Exhibit 3: Defendants' Invalidity Contentions for U.S. Pat. No. 8,843,224 filed Apr. 15, 2016, 118 pages.
*Sonos, Inc.* v. *D&M Holdings Inc. et al.,* Defendant's Initial Invalidity Contentions Exhibit 4: Defendants' Invalidity Contentions for U.S. Pat. No. 8,938,312 filed Apr. 15, 2016, 217 pages.
*Sonos, Inc.* v. *D&M Holdings Inc. et al.,* Defendant's Initial Invalidity Contentions Exhibit 5: Defendants' Invalidity Contentions for U.S. Pat. No. 8,938,637 filed Apr. 15, 2016, 177 pages.
*Sonos, Inc.* v. *D&M Holdings Inc. et al.,* Defendant's Initial Invalidity Contentions Exhibit 6: Defendants' Invalidity Contentions for U.S. Pat. No. 9,042,556 filed Apr. 15, 2016, 86 pages.
Network Time Protocol (NTP), RFC 1305 (Mar. 1992) (D+M_0397417-536) (120 pages).
"NexSys Software v.3 Manual," Crest Audio, Inc., 1997, 76 pages.
Non-Final Office Action dated Jul. 17, 2015, issued in connection with U.S. Appl. No. 14/465,417, filed Aug. 21, 2014, 13 pages.
Non-Final Office Action dated Feb. 8, 2017, issued in connection with U.S. Appl. No. 15/245,501, filed Aug. 24, 2016, 12 pages.
Non-Final Office Action dated Feb. 8, 2017, issued in connection with U.S. Appl. No. 15/245,591, filed Aug. 24, 2016, 12 pages.
Non-Final Office Action dated Sep. 8, 2016, issued in connection with U.S. Appl. No. 14/977,612, filed Dec. 21, 2015, 7 pages.
Non-Final Office Action dated Apr. 9, 2008, issued in connection with U.S. Appl. No. 10/845,805, filed May 15, 2004, 16 pages.
Non-Final Office Action dated Sep. 9, 2016, issued in connection with U.S. Appl. No. 14/977,597, filed Dec. 21, 2015, 7 pages.
Non-Final Office Action dated Feb. 10, 2017, issued in connection with U.S. Appl. No. 14/977,612, filed Dec. 21, 2015, 15 pages.
Non-Final Office Action dated Jul. 16, 2013, issued in connection with U.S. Appl. No. 13/212,889, filed Aug. 18, 2011, 11 pages.
Non-Final Office Action dated Aug. 17, 2010, issued in connection with U.S. Appl. No. 10/845,805, filed May 15, 2004, 19 pages.
Non-Final Office Action dated Jul. 17, 2015, issued in connection with U.S. Appl. No. 14/486,648, filed Sep. 15, 2014, 12 pages.
Non-Final Office Action dated Jun. 22, 2007, issued in connection with U.S. Appl. No. 10/845,805, filed May 15, 2004, 16 pages.
Non-Final Office Action dated Feb. 24, 2017, issued in connection with U.S. Appl. No. 14/977,597, filed Dec. 21, 2015, 14 pages.
Non-Final Office Action dated Mar. 3, 2020, issued in connection with U.S. Appl. No. 16/042,551, filed Jul. 23, 2018, 14 pages.
Non-Final Office Action dated Apr. 6, 2017, issued in connection with U.S. Appl. No. 14/950,233, filed Nov. 24, 2015, 16 pages.
Notice of Allowance dated Dec. 2, 2015, issued in connection with U.S. Appl. No. 14/486,648, filed Sep. 15, 2014, 6 pages.
Notice of Allowance dated Dec. 7, 2015, issued in connection with U.S. Appl. No. 14/465,417, filed Aug. 21, 2014, 6 pages.
Notice of Allowance dated Mar. 21, 2018, issued in connection with U.S. Appl. No. 14/950,233, filed Nov. 24, 2015, 5 pages.
Notice of Allowance dated Oct. 21, 2015, issued in connection with U.S. Appl. No. 14/042,098, filed Sep. 30, 2013, 17 pages.
Notice of Allowance dated May 23, 2014, issued in connection with U.S. Appl. No. 13/212,889, filed Aug. 18, 2011, 14 pages.
Notice of Allowance dated May 26, 2011, issued in connection with U.S. Appl. No. 10/845,805, filed May 15, 2004, 14 pages.
Notice of Allowance dated Sep. 4, 2020, issued in connection with U.S. Appl. No. 16/042,551, filed Jul. 23, 2018, 13 pages.
Palm, Inc., "Handbook for the Palm VII Handheld," May 2000, 311 pages.
Parasound Zpre2 Zone Preamplifier with PTZI Remote Control, 2005, 16 pages.
Pillai et al., "A Method to Improve the Robustness of MPEG Video Applications over Wireless Networks," Kent Ridge Digital Labs, 2000, 15 pages.
Presentations at WinHEC 2000, May 2000, 138 pages.
Proficient Audio Systems M6 Quick Start Guide, 2011, 5 pages.
Proficient Audio Systems: Proficient Editor Advanced Programming Guide, 2007, 40 pages.
Programming Interface for WL54040 Dual-Band Wireless Transceiver, AVAGO0066, Agere Systems, May 2004, 16 pages.
Radio Shack, "Auto-Sensing 4-Way Audio/Video Selector Switch," 2004, 1 page.
Radioshack, Pro-2053 Scanner, 2002 Catalog, part 1, 100 pages.
Radioshack, Pro-2053 Scanner, 2002 Catalog, part 2, 100 pages.
Radioshack, Pro-2053 Scanner, 2002 Catalog, part 3, 100 pages.
Radioshack, Pro-2053 Scanner, 2002 Catalog, part 4, 100 pages.
Radioshack, Pro-2053 Scanner, 2002 Catalog, part 5, 46 pages.
Rangan et al., "Feedback Techniques for Continuity and Synchronization in Multimedia Information Retrieval," ACM Transactions on Information Systems, 1995, pp. 145-176, vol. 13, No. 2.
Real Time Control Protocol (RTCP) and Realtime Transfer Protocol (RTP), RFC 1889 (Jan. 1996) (D+M_0397810-84) (75 pages).
Realtime Streaming Protocol (RTSP), RFC 2326 (Apr. 1998) (D+M_0397945-8036) (92 pages).
Realtime Transport Protocol (RTP), RFC 3550 (Jul. 2003) (D+M_0398235-323) (89 pages).
Reid, Mark, "Multimedia conferencing over ISDN and IP networks using ITU-T H-series recommendations: architecture, control and coordination," Computer Networks, 1999, pp. 225-235, vol. 31.
RenderingControl:1 Service Template Version 1.01 for UPnP, Version 1.0, (Jun. 25, 2002) (SONDM000115187-249) (63 pages).
"Residential Distributed Audio Wiring Practices," Leviton Network Solutions, 2001, 13 pages.
Rothermel et al., "An Adaptive Protocol for Synchronizing Media Streams," Institute of Parallel and Distributed High-Performance Systems (IPVR), 1997, 26 pages.
Rothermel et al., "An Adaptive Stream Synchronization Protocol," 5th International Workshop on Network and Operating System Support for Digital Audio and Video, Apr. 18-21, 1995, 12 pages.
Rothermel et al., "Synchronization in Joint-Viewing Environments," University of Stuttgart Institute of Parallel and Distributed High-Performance Systems, 1992, 13 pages.
"RVL-6 Modular Multi-Room Controller, Installation & Operation Guide," Nile Audio Corporations, 1999, 46 pages.
Simple Network Time Protocol (SNTPI), RFC 1361 (Aug. 1992) (D+M_0397537-46) (10 pages).
Simple Network Time Protocol (SNTPII), RFC 1769 (Mar. 1995) (D+M_0397663-76) (14 pages).
Simple Service Discovery Protocol/1.0 Operating without an Arbiter (Oct. 28, 1999) (24 pages).
*Sonos, Inc.* v. *D&M Holdings Inc. et al.,* Defendant's Initial Invalidity Contentions Exhibit 7: Defendants' Invalidity Contentions for U.S. Pat. No. 9,130,771 filed Apr. 15, 2016, 203 pages.
*Sonos, Inc.* v. *D&M Holdings Inc. et al.,* Defendant's Initial Invalidity Contentions Exhibit 8: Defendants' Invalidity Contentions for U.S. Pat. No. 9,195,258 filed Apr. 15, 2016, 400 pages.
*Sonos, Inc.* v. *D&M Holdings Inc. et al.,* Defendant's Initial Invalidity Contentions Exhibit 9: Defendants' Invalidity Contentions for U.S. Pat. No. 9,202,509 filed Apr. 15, 2016, 163 pages.
*Sonos, Inc.* v. *D&M Holdings Inc. et al.,* Defendant's Preliminary Identification of Prior Art References, provided Jul. 29, 2016, 5 pages.
*Sonos, Inc.* v. *D&M Holdings Inc. et al.,* Defendants' Brief in Support of their Motion for Leave to Amend their Answer to Add the Defense of Inequitable Conduct, provided Oct. 12, 2016, 24 pages.
*Sonos, Inc.* v. *D&M Holdings Inc. et al.,* Defendants' Opposition to Sonos's Motion to Strike Defendants' New Amended Answer Submitted with their Reply, provided Oct. 3, 2016, 15 pages.
*Sonos, Inc.* v. *D&M Holdings Inc. et al.,* Exhibit A: Defendants' Second Amended Answer to Plaintiffs' Third Amended Complaint, provided Oct. 12, 2016, 43 pages.

(56) References Cited

OTHER PUBLICATIONS

*Sonos, Inc. v. D&M Holdings Inc. et al.*, Exhibit B: Defendants' Second Amended Answer to Plaintiffs' Third Amended Complaint, provided Oct. 12, 2016, 43 pages.
*Sonos, Inc. v. D&M Holdings Inc. et al.*, Opening Brief in Support of Defendants' Motion for Leave to Amend Their Answer to Add the Defense of Inequitable Conduct, provided Aug. 1, 2016, 11 pages.
*Sonos, Inc. v. D&M Holdings Inc. et al.*, Order, provided Oct. 7, 2016, 2 pages.
*Sonos, Inc. v. D&M Holdings Inc. et al.*, Plaintiff's Opposition to Defendants' Motion for Leave to Amend Their Answer to Add the Defense of Inequitable Conduct, provided Aug. 26, 2016, 25 pages.
*Sonos, Inc. v. D&M Holdings Inc. et al.*, Redlined Exhibit B: Defendants' First Amended Answer to Plaintiffs' Third Amended Complaint, provided Aug. 1, 2016, 27 pages.
*Sonos, Inc. v. D&M Holdings Inc. et al.*, (No. 14-1330-RGA), DI 206-1, Transcript of 101 Hearing (Nov. 28, 2016) (28 pages).
*Sonos, Inc. v. D&M Holdings Inc. et al.*, (No. 14-1330-RGA), DI 207, Public Joint Claim Construction Brief (Nov. 30, 2016) (88 pages).
*Sonos, Inc. v. D&M Holdings Inc. et al.*, (No. 14-1330-RGA), DI 214, D&M Post-Markman Letter (Dec. 22, 2016) (13 pages).
*Sonos, Inc. v. D&M Holdings Inc. et al.*, (No. 14-1330-RGA), DI 215, Sonos Post-Markman Letter (Dec. 22, 2016) (15 pages).
*Sonos, Inc. v. D&M Holdings Inc. et al.*, (No. 14-1330-RGA), DI 219, Claim Construction Opinion (Jan. 12, 2017) (24 pages).
*Sonos, Inc. v. D&M Holdings Inc. et al.*, (No. 14-1330-RGA), DI 221, Claim Construction Order (Jan. 18, 2017) (2 pages).
*Sonos, Inc. v. D&M Holdings Inc. et al.*, (No. 14-1330-RGA), Markman Hearing Transcript (Dec. 14, 2016) (69 pages).
Sony: AIR-SA 50R Wireless Speaker, Copyright 2009, 2 pages.
Sony: Altus Quick Setup Guide ALT-SA32PC, Copyright 2009, 2 pages.
Sony: BD/DVD Home Theatre System Operating Instructions for BDV-E300, E301 and E801, Copyright 2009, 115 pages.
Sony: BD/DVD Home Theatre System Operating Instructions for BDV-IT1000/BDV-IS1000, Copyright 2008, 159 pages.
Sony: Blu-ray Disc/DVD Home Theatre System Operating Instructions for BDV-IZ1000W, Copyright 2010, 88 pages.
Sony: DVD Home Theatre System Operating Instructions for DAV-DZ380W/DZ680W/DZ880W, Copyright 2009, 136 pages.
Sony: DVD Home Theatre System Operating Instructions for DAV-DZ870W, Copyright 2008, 128 pages.
Sony Ericsson MS500 User Guide, Copyright 2009, 2 pages.
Sony: Home Theatre System Operating Instructions for HT-IS100, Copyright 2008, 168 pages.
Sony: HT-IS100, 5.1 Channel Audio System, last updated Nov. 2009, 2 pages.
Sony: Multi Channel AV Receiver Operating Instructions, 2007, 80 pages.
Sony: Multi Channel AV Receiver Operating Instructions for STR-DN1000, Copyright 2009, 136 pages.
Sony: STR-DN1000, Audio Video Receiver, last updated Aug. 2009, 2 pages.
Sony: Wireless Surround Kit Operating Instructions for WHAT-SA2, Copyright 2010, 56 pages.
Structured Media Components. Leviton Integrated Networks, last modified Apr. 10, 2006, 28 pages.
Taylor, Marilou, "Long Island Sound," Audio Video Interiors, Apr. 2000, 8 pages.
TOA Corporation, Digital Processor DP-0206 DACsys2000 Version 2.00 Software Instruction Manual, Copyright 2001, 67 pages.
TOA Electronics, Inc. DP-0206 Digital Signal Processor. DACsys 2000, 2001, 12 pages.
Understanding Universal Plug and Play, Microsoft White Paper (Jun. 2000) (D+M_0402074-118) (45 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
Universal Plug and Play Device Architecture V. 1.0, (Jun. 8, 2000) (54 pages).
Universal Plug and Play in Windows XP, Tom Fout. Microsoft Corporation (Jul. 2001) (D+M_0402041-73) (33 pages).
Universal Plug and Play ("UPnP") AV Architecture:1 for UPnP, Version 1.0, (Jun. 25, 2002) (D+M_0298151-72) (22 pages).
Universal Plug and Play Vendor's Implementation Guide (Jan. 5, 2000) (7 pages).
UPnP AV Architecture:0.83 for UPnP Version 1.0, Jun. 12, 2002, copyright 2000, 22 pages.
UPnP AV Architecture:0.83 (Jun. 12, 2002) (SONDM000115483-504) (22 pages).
UPnP Design by Example, A Software Developers Guide to Universal Plug and Play Michael Jeronimo and JackWeast, Intel Press (D+M_0401307-818) (Apr. 2003) (511 pages).
UPnP Forum. UPnP Device Architecture 1.0. Oct. 15, 2008, 80 pages.
UPnP; "Universal Plug and Play Device Architecture," Jun. 8, 2000; version 1.0; Microsoft Corporation; pp. 1-54.
WANCommonInterfaceConfig:1 Service Template Version 1.01 for UPnP, Ver. 1.0 (Nov. 12, 2001) (D+M_0401820-43) (24 pages).
"884+ Automatic Matrix Mixer Control System," Ivie Technologies, Inc., 2000, pp. 1-4.
Advanced Driver Tab User Interface WaveLan GUI Guide, AVAGO0009, Agere Systems, Feb. 2004, 4 pages.
Advisory Action dated Feb. 14, 2018, issued in connection with U.S. Appl. No. 14/950,233, filed Nov. 24, 2015, 3 pages.
Agere Systems' Voice-over-Wireless LAN (VoWLAN) Station Quality of Service, AVAGO0015, Agere Systems, Jan. 2005, 5 pages.
Akyildiz et al., "Multimedia Group Synchronization Protocols for Integrated Services Networks," IEEE Journal on Selected Areas in Communications, 1996 pp. 162-173, vol. 14, No. 1.
Audio Authority: How to Install and Use the Model 1154 Signal Sensing Auto Selector, 2002, 4 pages.
Audio Authority: Model 1154B High Definition AV Auto Selector, 2008, 8 pages.
AudioPoint from Home Director. Play Digital Music on Your Conventional Stereo System, 2002, 2 pages.
Audiopoint, Welcome to the coolest way to listen to digital music over your conventional stereo equipment, Home Director HD00B02, 2002, 2 pages.
AudioSource: AMP 100 User Manual, 2003, 4 pages.
Audio Tron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Automatic Profile Hunting Functional Description, AVAGO0013, Agere Systems, Feb. 2004, 2 pages.
"A/V Surround Receiver AVR-5800," Denon Electronics, 2000, 2 pages.
"A/V System Controleer, Owner's Manual," B&K Compontents, Ltd., 1998, 52 pages.
AVTransport:1 Service Template Version 1.01 for UPnP, Version 1.0 (Jun. 25, 2002) (66 pages).
AXIS Communication: AXIS P8221 Network I/O Audio Module, 2009, 41 pages.
Balfanz et al., "Network-in-a-Box: How to Set Up a Secure Wireless Network in Under a Minute," 13th USENIX Security Symposium—Technical Paper, 2002, 23 pages.
Balfanz et al., "Talking to Strangers: Authentication in Ad-Hoc Wireless Networks," Xerox Palo Alto Research Center, 2002, 13 pages.
Barham et al., "Wide Area Audio Synchronisation," University of Cambridge Computer Laboratory, 1995, 5 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bogen Communications, Inc., ProMatrix Digitally Matrixed Amplifier Model PM3180, Copyright1996, 2 pages.

(56) References Cited

OTHER PUBLICATIONS

Brassil et al., "Enhancing Internet Streaming Media with Cueing Protocols," 2000, 9 pages.
Breebaart et al., "Multi-Channel Goes Mobile: MPEG Surround Binaural Rendering," AES 29th International Conference, Sep. 2-4, 2006, pp. 1-13.
Cen et al., "A Distributed Real-Time MPEG Video Audio Player," Department of Computer Science and Engineering, Oregon Graduate Institute of Science and Technology, 1995, 12 pages.
Change Notification: Agere Systems WaveLan Multimode Reference Design (D2 to D3), AVAGO0042, Agere Systems, Nov. 2004, 2 pages.
Connection Manager: 1 Service Template Version 1.01 for UPnP, Version 1.0 (Jun. 25, 2002) (25 pages).
ContentDirectory:1 Service Template Version 1.01 for UPnP, Version 1.0 (Jun. 25, 2002) (89 pages).
Corrected Notice of Allowability dated Jan. 6, 2016, issued in connection with U.S. Appl. No. 14/465,417, filed Aug. 21, 2014, 3 pages.
Corrected Notice of Allowability dated Dec. 22, 2015, issued in connection with U.S. Appl. No. 14/486,648, filed Sep. 15, 2014, 3 pages.
Crest Audio Pro Series 8001 Power Amplifier. V. 2.2 Mar. 25, 1997, 2 pages.
Dannenberg et al., "A. System Supporting Flexible Distributed Real-Time Music Processing," Proceedings of the 2001 International Computer Music Conference, 2001, 4 pages.
Dannenberg, Roger B., "Remote Access to Interactive Media," Proceedings of the SPIE 1785, 1993, pp. 230-237.
Davies, Chris. Sony Ericsson MS500 Bluetooth Splashproof Speaker. http://www.slashgear.com/sony-ericsson-ms500-bluetooth-splashproof. Mar. 17, 2009, 2 pages.
Day, Rebecca, "Going Elan!" Primedia Inc., 2003, 4 pages.
Decker et al., "RFC 1493, Definitions of Managed Objects for Bridges," Network Working Group, Jul. 1993, 35 pages.
Deep-Sleep Implementation in WL60011 for IEEE 802.11b Applications, AVAGO0020, Agere Systems, Jul. 2004, 22 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Denon AV Surround Receiver AVR-1604/684 User's Manual, 2004, 128 pages.
Denon AV Surround Receiver AVR-5800 Operating Instructions, Copyright 2000, 67 pages.
Denon AVR-3805 A/V Surround Receiver. Datasheet, last modified Mar. 1, 2004, 2 pages.
Designing a UPnP AV MediaServer, Nelson Kidd (2003) (SONDM000115062-116) (55 pages).
"DP-0206 Digital Signal Processor," TOA Electronics, Inc., 2001, pp. 1-12.
DP-0206 TOA Digital Signal Processor. TOA Corporation, 2001, 4 pages.
Faller, Christof, "Coding of Spatial Audio Compatible with Different Playback Formats," Audio Engineering Society Convention Paper (Presented at the 117th Convention), Oct. 28-31, 2004, 12 pages.
Final Office Action dated Feb. 4, 2011, issued in connection with U.S. Appl. No. 10/845,805, filed May 15, 2004, 18 pages.

\* cited by examiner

PLAYBACK DEVICE USING STANDBY IN A MEDIA PLAYBACK SYSTEM

CROSS REFERENCE TO RELATED APPLICATIONS

This application claims priority under 35 U.S.C. § 120 to, and is a continuation of, U.S. non-provisional App. Ser. No. 16/042,551 filed on Jul. 23, 2018, entitled "Playback Device Using Standby Mode in a Media Playback System," which is incorporated herein by reference in its entirety.

U.S. non-provisional application Ser. No. 16/042,551 claims priority under 35 U.S.C. § 120 to, and is a continuation of, U.S. non-provisional application Ser. No. 14/950,233 filed on Nov. 24, 2015, entitled "Enabling Components of a Playback Device" and issued as U.S. Pat. No. 10,031,716 on Jul. 24, 2018, which is incorporated herein by reference in its entirety.

U.S. non-provisional application Ser. No. 14/950,233 claims priority under 35 U.S.C. § 120 to, and is a continuation of, U.S. non-provisional application Ser. No. 14/041,098 filed on Sep. 30, 2013, entitled "Media Playback System Using Standby Mode In A Mesh Network" and issued as U.S. Pat. No. 9,244,516 on Jan. 26, 2016, which is also incorporated herein by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud across multiple zone players in synchrony. The Sonos system can be controlled by software applications running on network capable mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
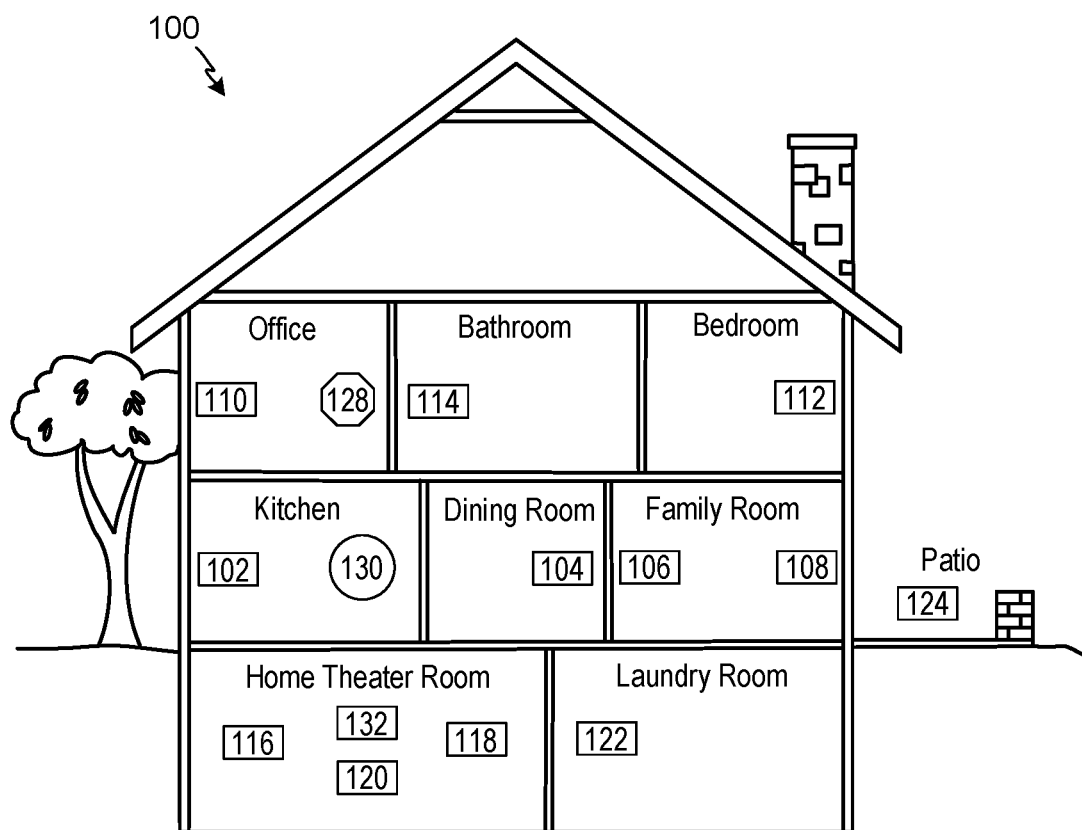
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein involve mechanisms to wake-up a media playback device that is interconnected with other media playback devices to form a networked media system from a standby mode using a network message. For example, the network message, referred to hereafter as a "wake-up packet", may be received by a media playback device, cause the media playback device to exit a standby mode, and then be forwarded by the media playback device to one or more additional media playback devices in the networked media system. In some embodiments, this process is repeated at additional media playback devices in the networked media system so as to cause the additional devices to exit the standby mode. In other embodiments, the wake-up packet may cause only a single media playback device, or a group of media playback devices, to wake-up from the standby mode. The embodiments described herein may thereby provide "wake" functionality for media playback devices in a network.

Wake-on-LAN (WOL) is a computer networking mechanism that allows a device to be turned on or awakened by a network message sent by another device on the same local area network (LAN). The WOL mechanism is known as Wake-on-Wireless (WoW) when the device being awakened is communicating over a wireless medium. As will be appreciated by those having skill in the art, conventional WOL or WoW techniques require that devices within the network be directly reachable by the source of the network message. When devices are configured in an ad-hoc or mesh network such that one or more indirect routes between devices exist within the network, a different mechanism is needed.

In some embodiments, a networked media playback system may be configured in an ad-hoc (or mesh) network, such that each media playback device may participate in network routing with other media playback devices. In some embodiments, the ad-hoc network may be configured as a layer-2 mesh network using a spanning tree protocol (STP) for network routing. The mesh network may comprise both wired and wireless links between devices, whereby one or more point-to-point routes exist between media playback devices. To prevent routing loops, conventional STP protocols generally utilize non-direct routes instead of direct routes to support communication between playback devices. Based on this STP protocol, a networked media playback system may include one or more non-direct routes between media playback devices. For example, a source device that is sending a wake-up packet to media playback device may be prevented from communicating directly with the media playback device because the route between the source device and the media playback device is through another intermediary media playback device. Therefore, to send the wake-up packet to the media playback device, the source device may communicate via a non-direct route through the intermediary media playback device.

Further, as described above, in some embodiments, the one or more media playback devices may include a standby mode. In the standby mode, one or more components of a media playback device may be disabled or put into a sleep mode. For example, one embodiment of standby mode might involve disabling an audio stage of the media playback device. As another example, standby mode might involve putting a wireless network interface into a sleep mode.

In some embodiments, the various device modes may include an active mode. In the active mode, one or more components of a media playback system may be enabled or taken out of a sleep mode. For example, active mode might involve taking a processor out of a sleep mode.

In some embodiments, a wake-up packet may be sent as an IP broadcast message having a payload that may cause a media playback device to wake-up from standby mode. In some embodiments, the payload may include a broadcast destination MAC address. The broadcast destination MAC address may be used to target all devices within the networked media playback system. This mechanism may be used to wake-up multiple devices within the networked media playback system or a subset of devices based on certain conditions. In other embodiments, the payload may include a unicast destination MAC address. This mechanism may be used to wake-up a single media playback device and the media playback devices needed to form a playback path (i.e., a network path or route used to forward audio packets from an audio source to the single media playback device).

As indicated above, the present application involves mechanisms to wake-up a media playback device from a standby mode using a network message known as a wake-up packet, wherein the media playback device is interconnected with other media playback devices to form a networked media playback system. In one aspect, a method is provided. The method involves receiving, by a first media playback device, while the first media playback device is in a standby mode, a first wake-up packet that includes a first payload that is associated with a MAC broadcast address. In response to receiving the first wake-up packet, the method further involves exiting, by the first media playback device, the standby mode and entering an active mode, and broadcasting, by the first media playback device a second wake-up packet that includes a second payload that is associated with the MAC broadcast address.

In another aspect, a non-transitory computer readable memory is provided. The non-transitory computer-readable storage medium includes a set of instructions for execution by a processor. The set of instructions, when executed, cause a first media playback device to receive, by a first media playback device, while the first media playback device is in a standby mode, a first wake-up packet that includes a first payload that is associated with a MAC broadcast address. In response to receiving the first wake-up packet, the set of instructions, when executed, further cause the first media playback device to exit, by the first media playback device, the standby mode, and enter an active mode; and broadcast, by the first media playback device, a second wake-up packet that includes a second payload that is associated with the MAC broadcast address.

In a further aspect, a media playback device is provided. The device includes a network interface, a processor, a data storage, and a program logic stored in the data storage and executable by the processor to receive, by the first media playback device, while the media playback device is in a standby mode, a first wake-up packet that includes a first payload that is associated with a MAC broadcast address. In response to receiving the first wake-up packet, the program logic is further executable by the processor to exit, by the first media playback device, the standby mode and enter an active mode, and broadcast, by the first media playback device, a second wake-up packet that includes a second payload that is associated with the MAC broadcast address.

In yet another aspect, a media playback system is provided. The system includes a first media playback device and a second media playback device. The first media playback device includes a network interface, a processor, a data storage and executable by the processor to receive, by the first media playback device, while the media playback device is in a standby mode, a first wake-up packet that includes a first payload that is associated with a MAC broadcast address. In response to receiving the first wake-up packet, the program logic is further executable by the processor to exit, by the first media playback device, the standby mode and enter an active mode, and broadcast, by the first media playback device, a second wake-up packet that includes a second payload that is associated with the MAC broadcast address.

In another aspect, a method is provided in a local area network comprising a plurality of devices, including at least a first media playback device and a second media playback device. The method includes receiving, by a first media playback device, while the first media playback device is in a standby mode, a first wake-up packet that includes a first payload that is associated with a first MAC address. In response to receiving the first wake-up packet, the method further includes determining, by the first media playback device, whether the first MAC address is included in a list of MAC addresses maintained by the first media playback device. When the first MAC address is included in the list of MAC addresses, the method further includes exiting, by the first media playback device, the standby mode, and entering an active mode, and broadcasting, by the first media playback device, a second wake-up packet that includes a second payload that is associated with the first MAC address.

In a further aspect, a non-transitory computer readable memory is provided. The non-transitory computer-readable storage medium includes a set of instructions for execution by a processor. The set of instructions, when executed, cause a first media playback device to receive, by a first media playback device while the first media playback device is in standby mode, a first wake-up packet that includes a first payload that is associated with a first MAC address. In response to receiving the first wake-up packet, the set of instructions further cause the first media playback device to determine, by the first media playback device, whether the first MAC address is included in a list of MAC addresses maintained by the first media playback device. When the first MAC address is included in the list of MAC addresses, the set of instructions further cause the first media playback device to exit, by the first media playback device, the standby mode and enter an active mode, and broadcast, by the first media playback device, a second wake-up packet that includes a second payload that is associated with the first MAC address.

In yet another aspect, a media playback device is provided. The device includes a network interface, a processor, a data storage, and a program logic stored in the data storage and executable by the processor to receive, by the first media playback device is in standby mode, a first wake-up packet that includes a first payload that is associated with a first MAC address. In response to receiving the first wake-up packet, the program logic is further executable by the processor to determine, by the first media playback device, whether the first MAC address is included in a list of MAC addresses maintained by the first media playback device. When the first MAC address is included in the list of MAC addresses, the program logic is further executable by the processor to exit, by the first media playback device, the standby mode and enter an active mode, and broadcast, by the first media playback device, a second wake-up packet that includes a second payload that is associated with the first MAC address.

In a further aspect, a media playback system is provided. The system includes a first media playback device and a second media playback device. The first media playback device includes a network interface, a processor, a data storage and executable by the processor to receive, by the first media playback device is in standby mode, a first wake-up packet that includes a first payload that is associated with a first MAC address. In response to receiving the first wake-up packet, the program logic is further executable by the processor to determine, by the first media playback device, whether the first MAC address is included in a list of MAC addresses maintained by the first media playback device. When the first MAC address is included in the list of MAC addresses, the program logic is further executable by the processor to exit, by the first media playback device, the standby mode and enter an active mode, and broadcast, by the first media playback device, a second wake-up packet that includes a second payload that is associated with the MAC address.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, although it should be understood that the home could be configured with only one zone. Additionally, one or more zones can be added to the configuration 100 over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. Zone players 102-124, also referred to herein as playback devices, multimedia units, speakers, players, and so on, provide audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
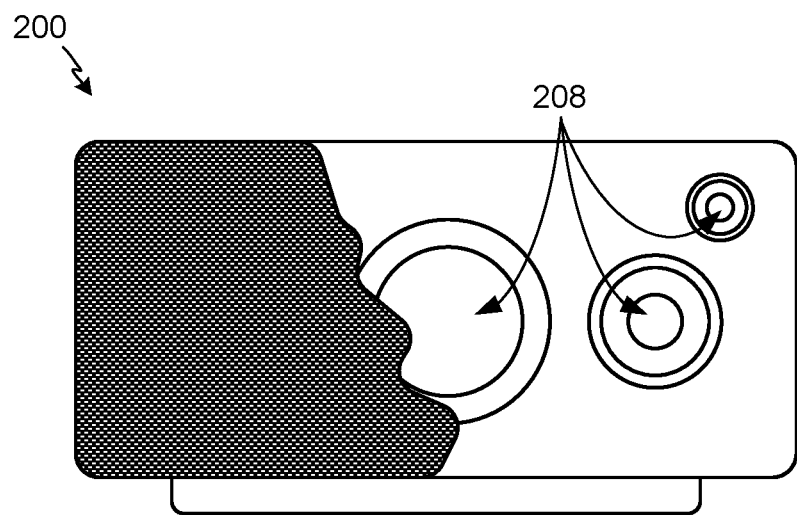
FIG. 2A shows an illustration of an example zone player having a built-in amplifier and transducers.
Figure 2B:
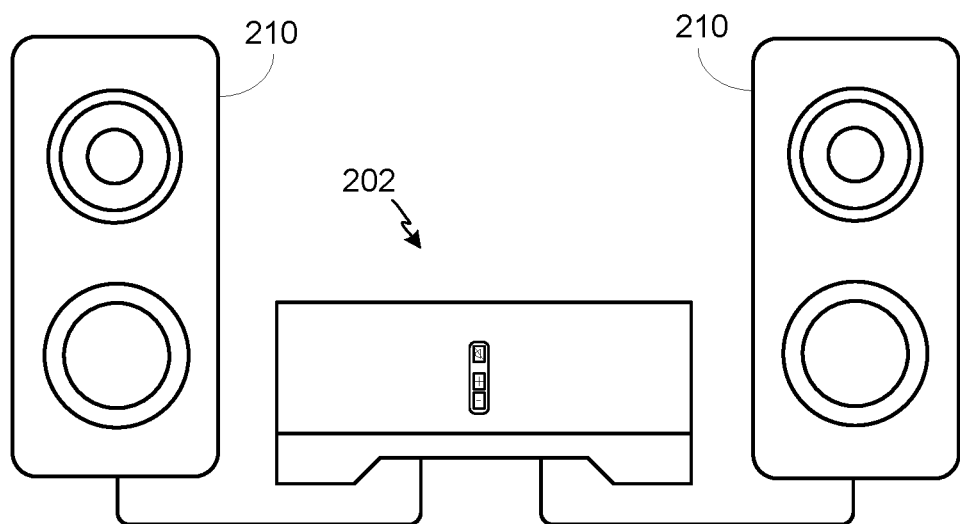
FIG. 2B shows an illustration of an example zone player having a built-in amplifier and connected to external speakers.
Figure 2C:
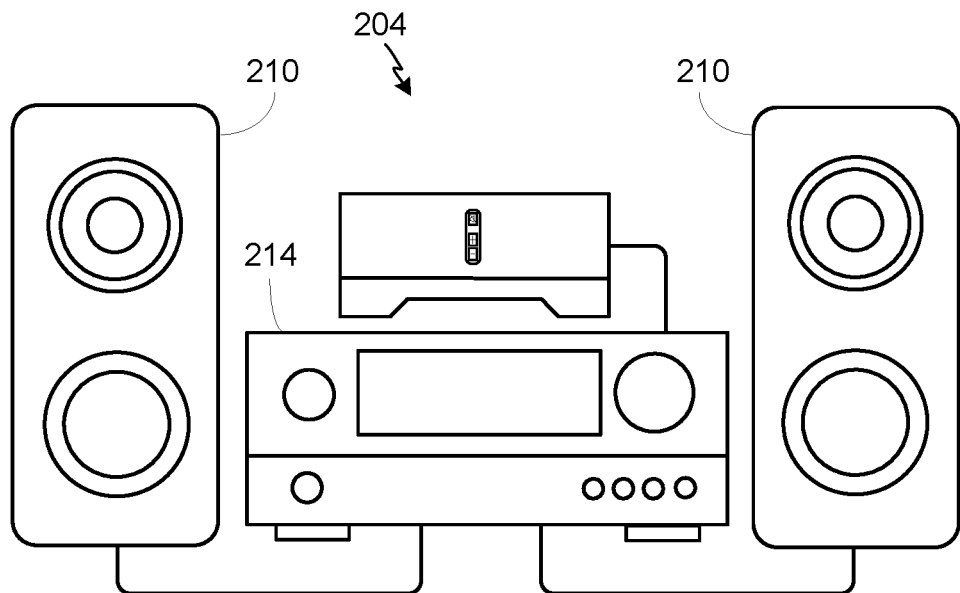
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates a zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the media content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, radio station name, playlist, or other some other representation. A user can populate the playback queue with audio items of interest. The user may also modify and clear the playback queue, if so desired.

By way of illustration, SONOS, Inc. of Santa Barbara, California presently offers for sale zone players referred to as a "PLAY:5," "PLAY:3," "PLAYBAR," "CONNECT: AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple iPod™ or similar device.

b. Example Controllers

Figure 3:
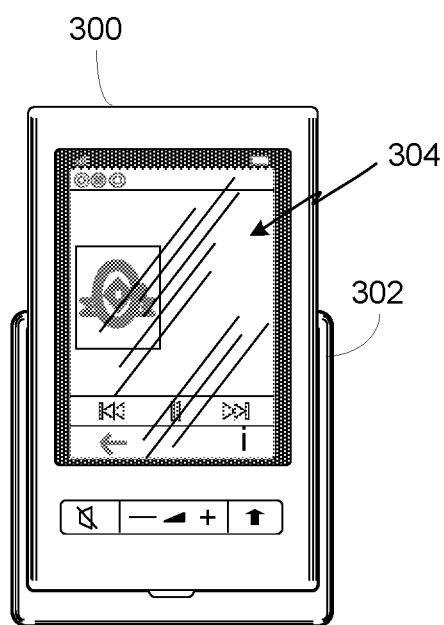
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, modify and/or clear the playback queue of one or more zone players, control other operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an iPhone™, iPad™, Android™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for iPhone™," "SONOS® Controller for iPad™," "SONOS® Controller for Android™," "SONOS® Controller for Mac™ or PC."

c. Example Data Connection

Zone players 102-124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" contains two or more zone players, such as the two zone players 106 and 108 in the family room whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for an individual to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as Airplay™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
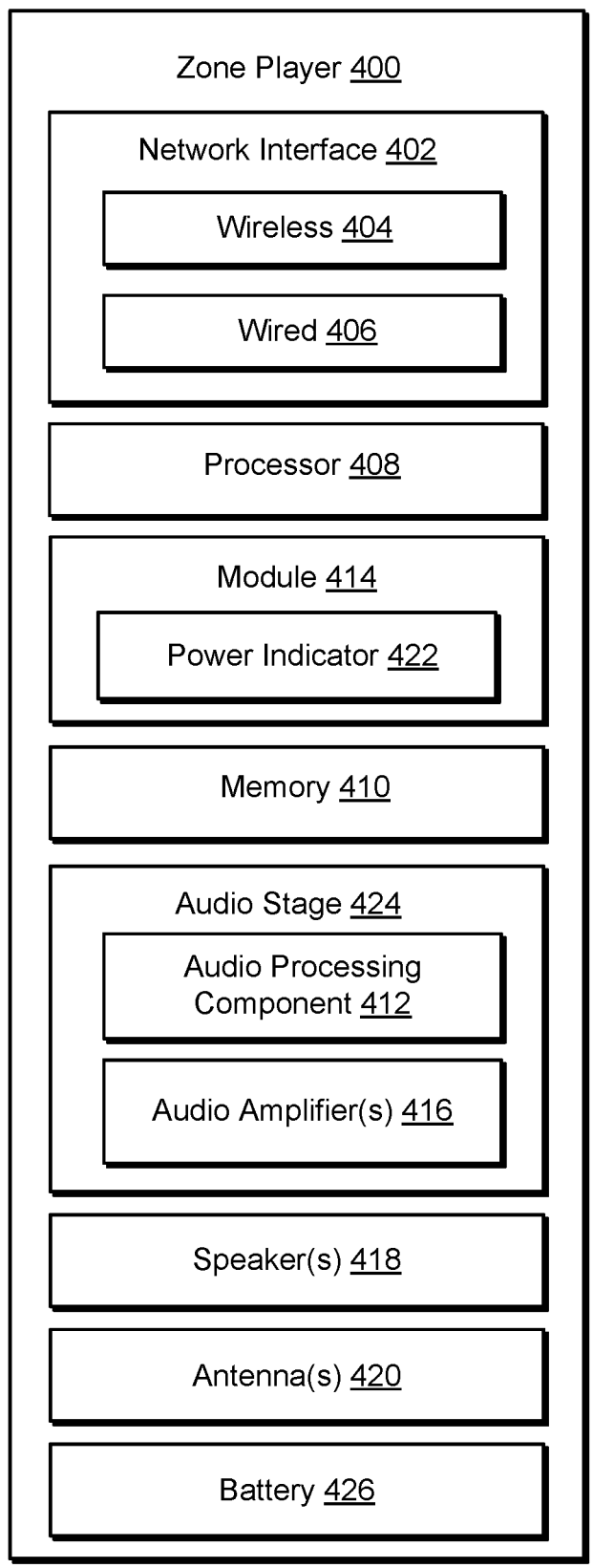
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, one or more device modules 414, an audio stage 424, including an audio processing component 412 and an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.11ac, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio stage is a system for producing processed amplified analog audio signals for playback through speakers. The audio stage 424 can include an audio processing component 412 and an audio amplifier 416, or it may include only one of these components.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

Further, in some instances, zone player 400 may be a powered by a direct current (DC) power supply, e.g., a battery 426. Yet further, power indicator 422 may identify the level of power in battery 426 of zone player 400. Based on the level of power in battery 426, controller 500 may adjust the payload of the wake-up packet to wake-up a different subset of zone players 400 to conserve the power remaining in battery 426.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
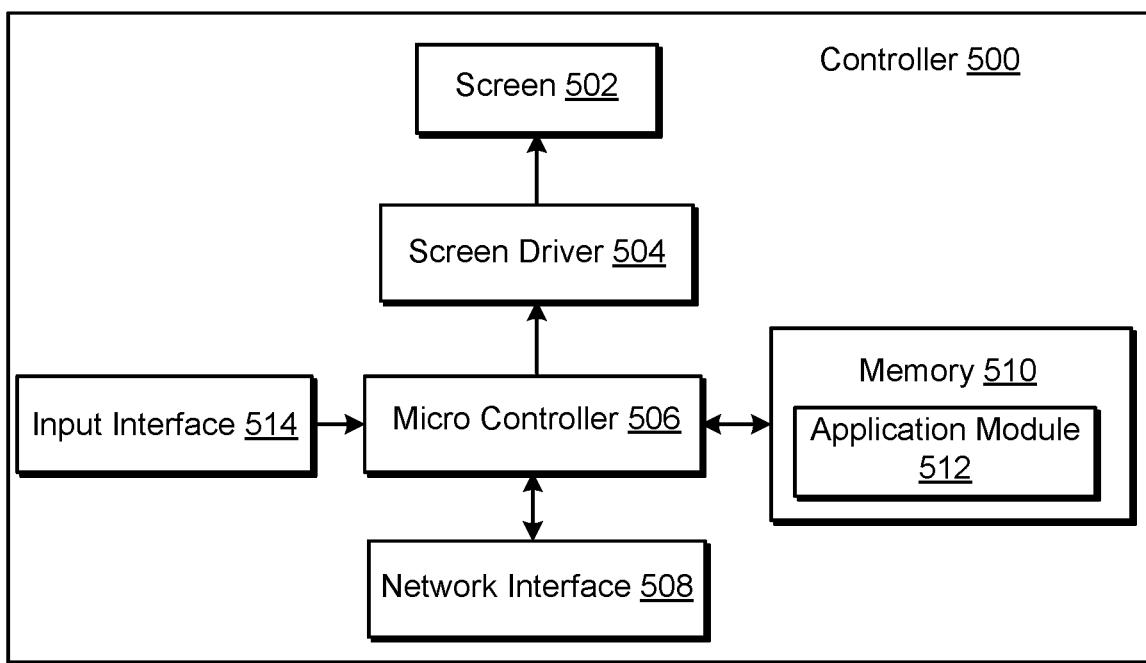
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.11ac, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group to facilitate synchronized playback amongst the zone players in the zone group. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an iPhone™, iPad™ or any other smart phone or network-enabled device (e.g., a networked computer such as a PC or Mac™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer. In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration and revert the zones to their prior configuration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room may be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
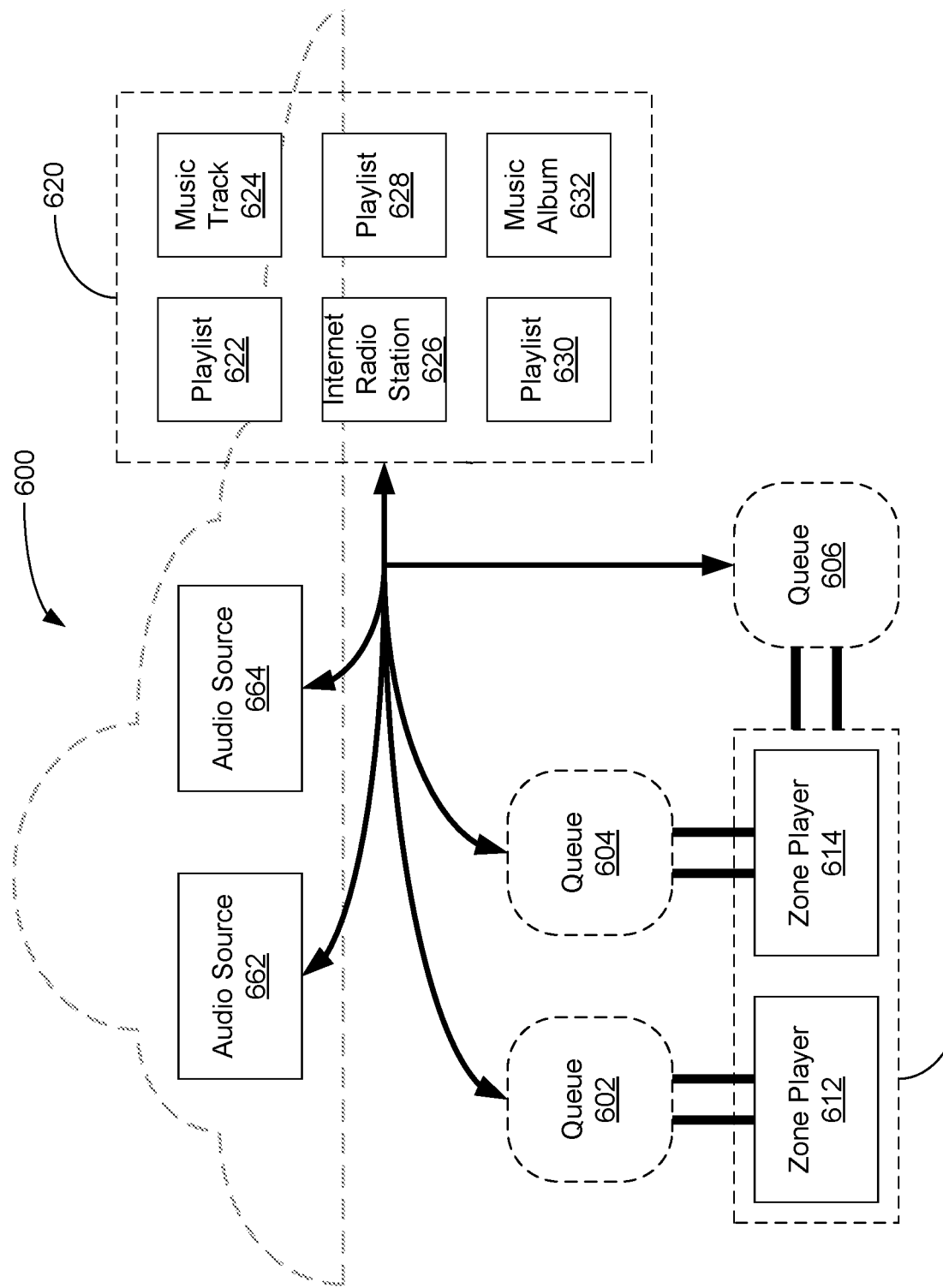
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
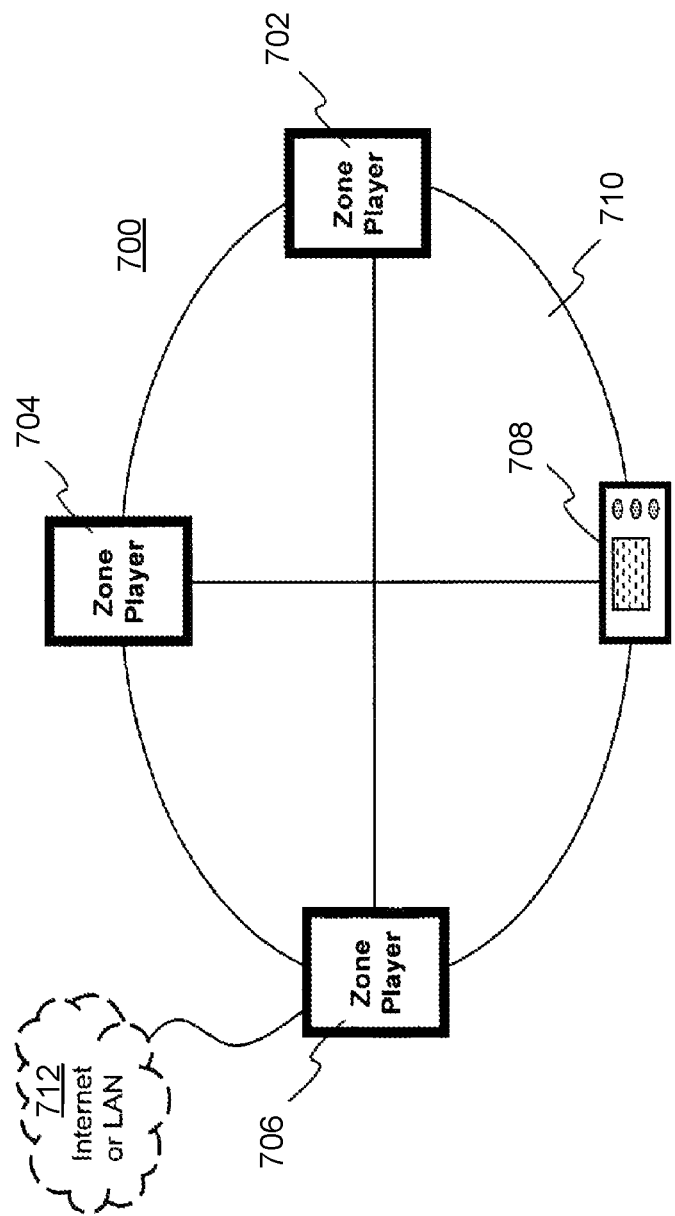
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
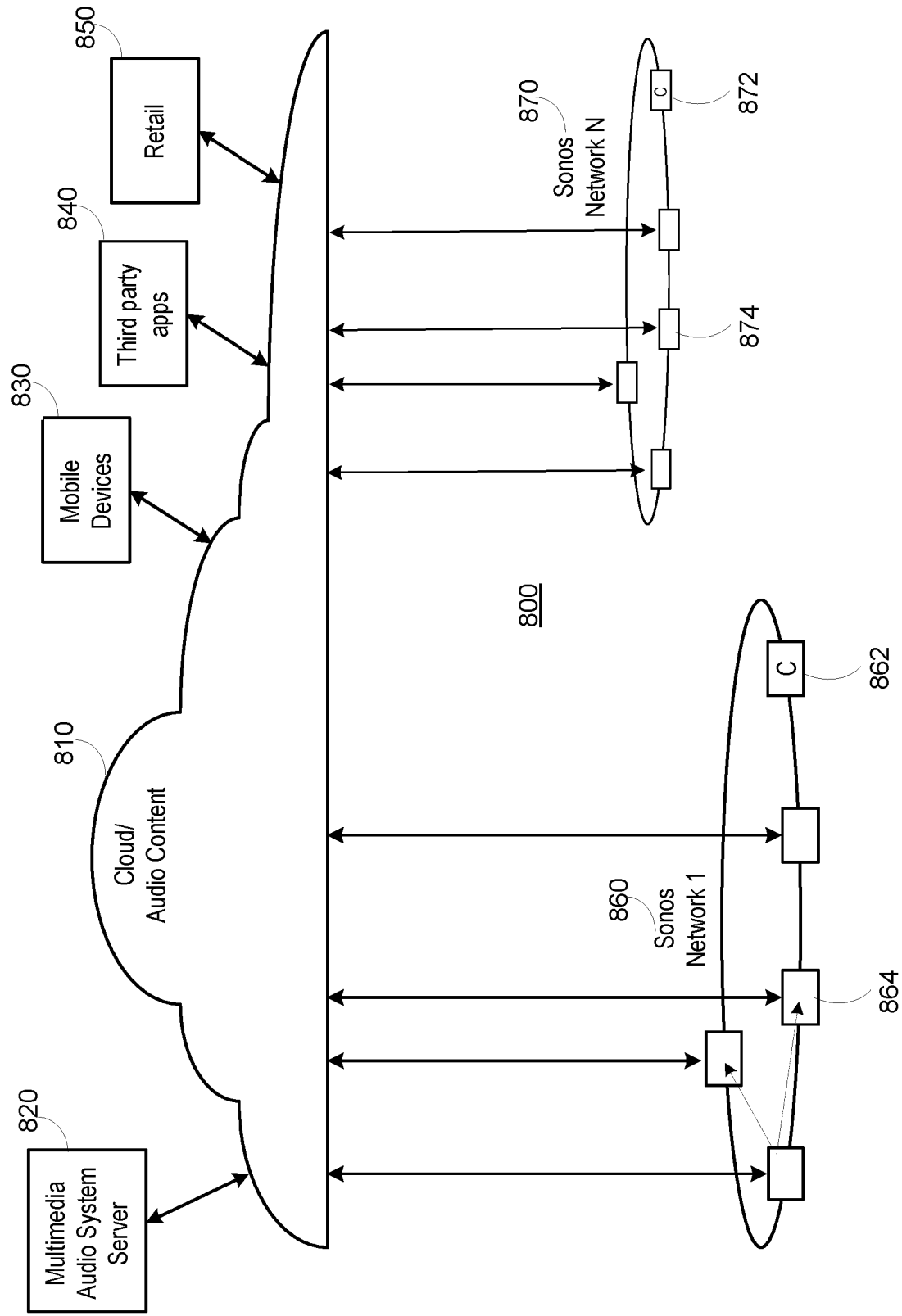
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Example First Method for Media Playback Device Wake-Up

As discussed above, embodiments described herein may involve mechanisms to wake-up a media playback device that is interconnected with other media playback devices to form a networked media playback system from a standby mode using a network message known as a wake-up packet. Further, as noted above, the wake-up packet may have various payloads depending on the media playback devices that are targeted by the wake-up packet. In some embodiments, the wake-up packet may have a broadcast destination address in the payload. These embodiments may be used to wake multiple media playback devices within the networked media playback system, or they may be used to wake a subset of media playback devices according to certain conditions.

Figure 9:
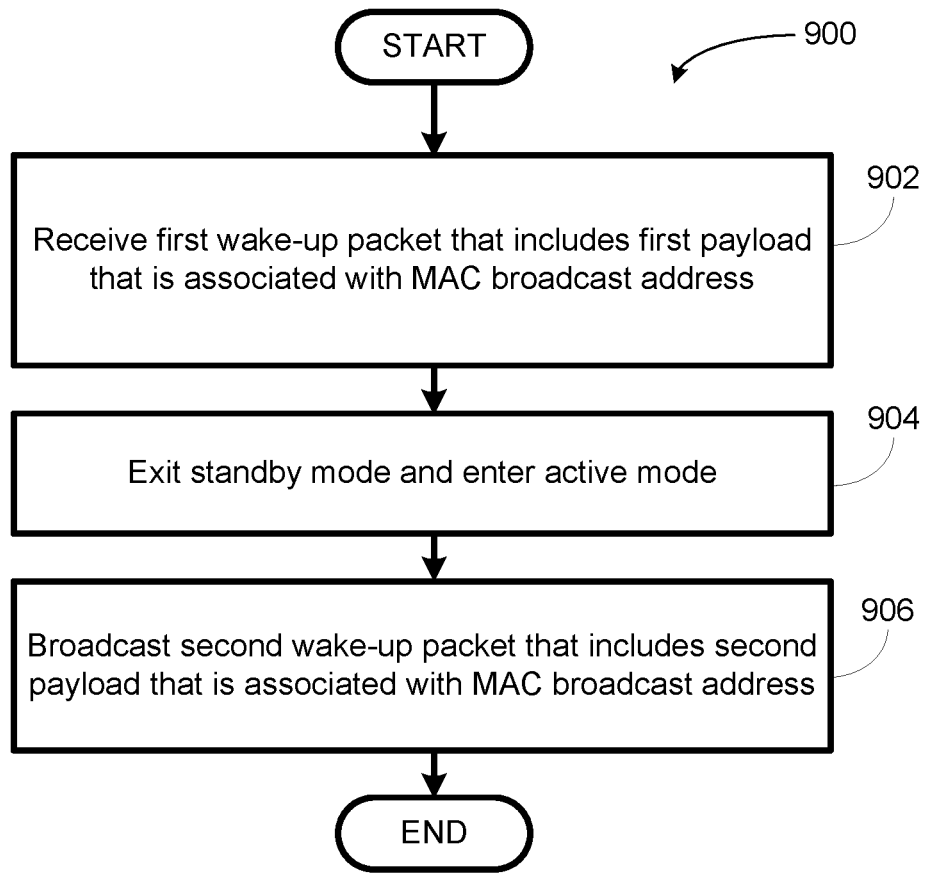
FIG. 9 shows an example flow diagram for waking media playback devices from a standby mode in a point-to-point network with a wake-up packet associated with a broadcast destination MAC address.
Figure 11:
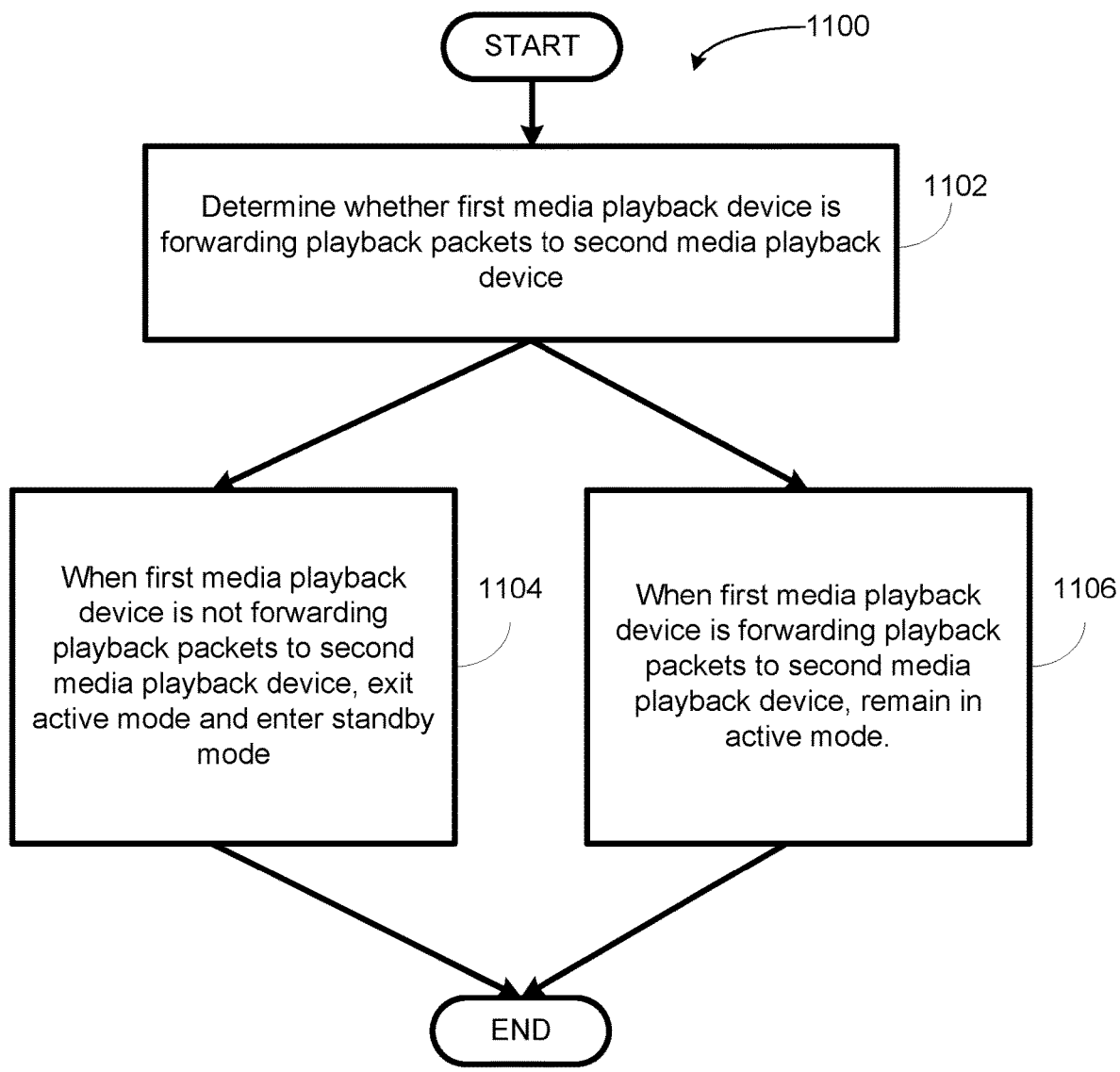
FIG. 11 shows an example flow diagram for putting media playback devices in a standby mode.

FIG. 9 shows an example flow diagram for waking media playback devices from standby mode using a wake-up packet including a broadcast destination MAC address, in accordance with at least some embodiments described herein. Method 900 shown in FIG. 9 presents an embodiment of a method that could be used in the environments 100, 600, 700, 800, or 1200 with the systems 200, 202, 204, 300, 400, and 500 for example. FIG. 11 shows an example flow diagram presenting method 1100 for putting media playback devices into standby mode that may, in some embodiments, be used in conjunction with method 900 in the environments 100, 600, 700, 800, or 1200 with the systems 200, 202, 204, 300, 400, and 500 for example. For example, each of bocks 1102-1106 may be carried out before, after, or concurrently with each of blocks 902-906.

Figure 12:
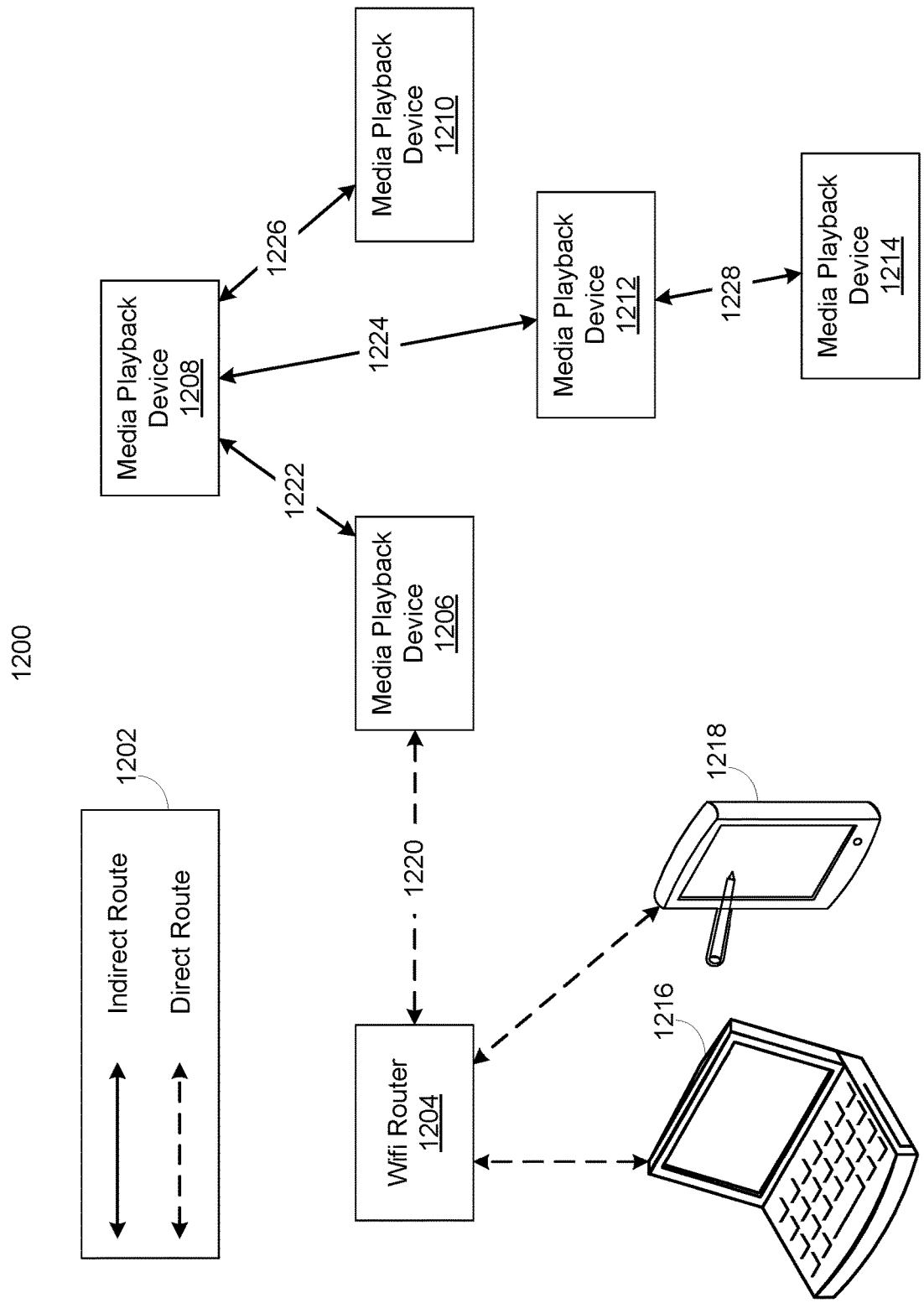
FIG. 12 shows an example illustration of a mesh-networked media playback system.

In some embodiments, two or more media playback devices may be interconnected in a network to form a media playback system. FIG. 12 shows example media playback devices and example controllers as part of a networked media playback system. As described above, in some embodiments, a networked media playback system may be configured in an ad-hoc (or mesh) network, such that each media playback device may participate in network routing with other media playback devices. The networked media playback system 1200 includes example media playback devices 1206, 1208, 1210, 1212, and 1214. The networked media playback system also includes example controllers 1216 and 1218 connected to wireless router 1204. The media playback devices 1206-1214 and the controllers 1216-1218 form a mesh network. The mesh network comprises point-to-point paths 1220-1228 between devices (i.e., the media playback devices and the wireless router). Relative to the controllers 1216 and 1218, only media playback device 1206 has a direct route to the controllers because the wireless router broadcasts packets over its wired and wireless interfaces. Media playback devices 1208-1214 are connected to the controllers indirectly through at least one other media playback device (i.e., media playback device 1206).

As a general matter, each of blocks 902-906 and 1102-1106 may be carried out by one or more media playback devices. Media playback devices may include any one or more of zone players 102-124 of FIG. 1. Further, media playback devices may include any one or more of zone players 200, 202, and 204 of FIGS. 2A, 2B, and 2C, respectfully. Yet further, media playback devices may include any one or more of zone player 400 of FIG. 4 and zone players 612 and 614 of FIG. 6. In addition, media playback devices may also include any one or more of zone players 702-706 of FIG. 7 and/or playback devices 864 and 874 of FIG. 8. Further, media playback devices may include media playback devices 1206, 1208, 1210, 1212, or 1214 of FIG. 12. Other possibilities may also exist. It should be understood that media playback devices may be described herein as a "first media playback device", a "second media playback device", "at least one additional media playback device", and/or "a third media playback device" to distinguish one playback device from another.

Methods 900 and 1100 may include one or more operations, functions, or actions as illustrated by one or more of blocks 902-906 and 1102-1106. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 900, 1100, and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

a. Receiving, while the First Media Playback Device is in a Standby Mode, a First Wake-Up Packet At block 902, the method 900 may involve receiving, by a first media playback device, while the first media playback device is in a standby mode, a first wake-up packet that includes a first payload that is associated with a MAC broadcast address. As described above, the first media playback device may have a network interface. For example, a first media playback device might be a first zone player 400 of FIG. 4 that has a network interface 402. The first zone player 400 may receive a wake-up packet over wireless network interface 404 or wired network interface 406. In some embodiments, the wake-up packet may be received over either wireless network interface 404 or wired network interface 406. In other embodiments, the wake-up packet may be received over both wireless network interface 404 and wired network interface 406.

Figure 10:
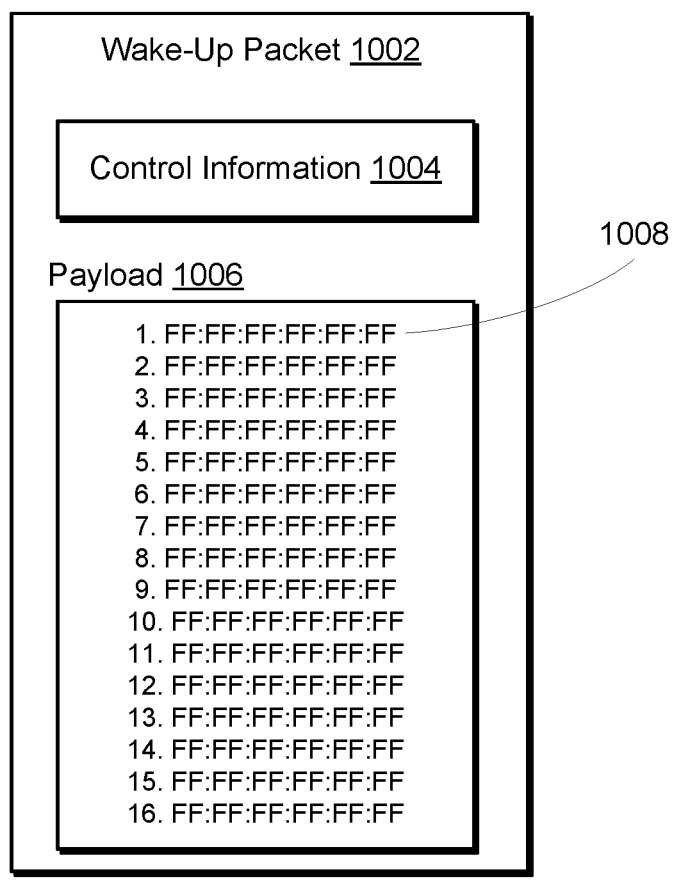
FIG. 10 shows an example illustration of a wake-up packet associated with a broadcast destination MAC address.

The first wake-up packet includes a first payload that is associated with a MAC broadcast address. Consider FIG. 10 showing an example wake-up packet 1002 having control information 1004, a payload 1006, and a MAC address 1008 associated with the payload 1006. For example, first wake-up packet 1002 may include first payload 1006 associated with media access control (MAC) address 1008. The first wake-up packet 1002 may be a formatted unit of data carried by a packet-switched network, such as network 600 or Ad-Hoc network 700.

MAC address 1008 may be a unique identifier assigned to network interfaces for network communications. For example, wireless network interface 404 may have a unique MAC address to identify the wireless network interface 404 on network 710, 712, 850, or 860. The MAC address may conform to the IEEE 802 standard format having a 48-bit address space.

The first payload 1006 may be associated with media access control (MAC) address 1008. The first payload 1006 may include sixteen repetitions of a MAC address 1008. Sixteen repetitions of a MAC address 1008 may be recognized by the first media playback device as a signal to enter or exit a device mode, such as a standby mode. In some embodiments, MAC address 1008 might be the broadcast destination address. In some embodiments, the broadcast destination address may be the MAC address FF:FF:FF:FF:FF:FF, otherwise known as the "all F" address.

The control information 1004 may include, along with other information, a destination address. In some embodiments, the destination address will be the broadcast destination address. In some embodiments, the broadcast destination address may be the MAC address FF:FF:FF:FF:FF:FF, otherwise known as the "all F" address.

In some embodiments, such as wherein a first media playback device and a second media playback device are interconnected to form a media playback system, a second media playback device may receive, by the second media playback device while the second media playback device is in standby mode, a second wake-up packet. For example, media playback device 1206 in FIG. 12 may receive a first wake-up packet 1002 and media playback device 1208 may receive a second wake-up packet 1002. In some embodiments, multiple media playback devices may receive additional wake-up packets 1002. For example, each of media playback devices 1206, 1208, 1210, 1212, and 1214 may receive a wake-up packet.

The first wake-up packet 1002 may be sent from any device within the network 710, 712, 850, or 860. For example, the first wake-up packet 1002 may be sent from controller 500 using network interface 508 when a user initiates the playback of an audio track using input interface 514. Or, the wake-up packet 1002 may be sent from an additional zone player 400 using network interface 402. Alternatively, the first wake-up packet 1002 may originate at a controller 500 and be routed through one or more additional intermediary zone players 400 before being received by the first zone player 400. For example, the first wake-up packet may originate at controller 1216 or 1218 and be routed through intermediary media playback device 1206 before being received by media playback device 1208. In some embodiments, the first wake-up packet may originate at a wireless media playback device, such as media playback device 1206.

In method 900, the first media playback device may be configured to be initially in a standby mode, e.g., before executing block 902 in method 900. For example, the first zone player 400 may be configured to be in standby mode. For example, media playback device 1206 may be in a standby mode. Standby mode may involve disabling one or more components of the media playback device. Further, standby mode may involve putting one or more components in a sleep mode, a standby mode, or the like. In some embodiments, standby mode may involve disabling one or more audio playback components. Standby mode may reduce overall power consumption by the first media playback device as compared to other device modes.

In some embodiments, such as wherein a first media playback device and a second media playback device are interconnected to form a media playback system, the second media playback device may be configured to be initially in a standby mode. For example, the first media playback device 1206 may be may be configured to be initially in a standby mode and the second media playback device 1208 may be configured to be initially in a standby mode.

In further embodiments, standby mode may involve one or more of the following: disabling an audio playback stage of the first media playback device; enabling a processor sleep mode for a processor of the first media playback device; or enabling a network interface sleep mode for at least one network interface of the first media playback device. For example, standby mode for zone player 400 might involve disabling audio stage 424 or components thereof, such as audio processing component 412 or audio amplifier 416. Standby mode for zone player 400 might additionally or alternatively involve enabling a sleep mode for processor 408 or network interface 402. Sleep mode for processor 408 may be, for example, a device mode in which the processor does not execute instructions. Sleep mode for network interface 402 may be, for example, a device mode in which the network interface is not actively communicating, but instead periodically checking for an incoming message, such as a wake-up packet 1002. The examples described above are provided to illustrate possible embodiments of standby mode. Other embodiments not described here are contemplated.

b. Exiting the Standby Mode and Entering an Active Mode

At block 904, method 900 may involve the first media playback device responding to receiving the first wake-up packet by exiting the standby mode and entering an active mode. For example, the first zone player 400 may respond to receiving the first wake-up packet by exiting the standby mode and enter the active mode. For example, media playback device 1206 may respond to receiving the first wake-up packet by exiting the standby mode and entering the active mode. Active mode may involve enabling one or more components of the media playback device. Further, active mode may involve taking one or more components out of a sleep mode, a standby mode, or the like. In some embodiments, active mode may involve enabling one or more audio playback components.

In some embodiments, such as wherein a first media playback device and a second media playback device are interconnected to form a media playback system, the second media playback device may respond to receiving the first wake-up packet by exiting the standby mode and entering the active mode.

In some embodiments, active mode may involve one or more of the following: enabling an audio playback stage of the first media playback device; disabling a processor sleep mode for a processor of the first media playback device; or disabling a network interface sleep mode for at least one network interface of the first media playback device. For example, active mode for zone player 400 might involve enabling audio stage 424 or components thereof, such as audio processing component 412 or audio amplifier 416. Additionally or alternatively, active mode for zone player 400 might involve disabling a sleep mode for processor 408 or network interface 402. Active mode might also be referred to as the normal operating mode for the first media playback device. In some embodiments, the first media playback device may consume more power in active mode as compared with at least one other device mode, such as standby mode.

c. Broadcasting a Second Wake-Up Packet that Includes a Second Payload that is Associated with the MAC Broadcast Address At block 906, method 900 may involve the first media playback device responding to receiving the first wake-up packet by broadcasting a second wake-up packet that includes a second payload that is associated with the MAC broadcast address. In some embodiments, broadcasting the second wake-up packet will involve creating a second wake-up packet and transmitting the second wake-up packet on a network interface. For example, the first zone player 400 may create a second wake-up packet 1002 and transmit the second wake-up packet 1002 on network interface 402 using either wireless network interface 404 or wired interface 406. The second wake-up packet 1002 may include the broadcast address as the destination address in the control information 1004. Moreover, the second wake-up packet 1002 may include a second payload 1006 that includes the broadcast destination address. In some embodiments, the second payload 1006 may have sixteen repetitions of the broadcast destination address. However, the second payload 1006 may have other data in addition to the broadcast destination address or repetitions thereof.

As another example, media playback device 1206 in FIG. 12 may receive a first wake-up packet 1002, exit the standby mode, and broadcast a second wake-up packet 1002. When the first media playback device 1206 is part of a media playback system 1200, the second wake-up packet 1002 may be received by one or more additional media playback devices. For example, after media playback device 1206 broadcasts the second wake-up packet 1002, media playback device 1208, may receive the second wake-up packet 1002. In response to receiving the second wake-up packet 1002, media playback device 1208 may exit standby mode and enter active mode, and broadcast a third wake-up packet 1002. The third wake-up packet 1002 may include a third payload 1006 that is associated with the MAC broadcast address 1008.

The method 900 may be repeated at additional media playback devices within the media playback system until so as to cause additional media playback devices in the system to be woken up. For example, each of media playback devices 1206, 1208, 1210, 1212, and 1214 may receive a wake-up packet, exit standby mode and enter active mode, and broadcast a wake-up packet.

Further, in some embodiments, the second payload 1006 included in the second wake-up packet 1002 may be the same payload 1006 as the first payload included in the first wake-up packet 1002. For example, the first zone player 400 may copy the first payload 1006 from the first wake-up packet 1002 to the second wake-up packet 1002. Or, the first zone player 400 may translate the information in the first payload 1006 from the first wake-up packet 1002 to the second payload 1006 in the second wake-up packet 1002.

Further, in some embodiments, additional functions may be carried out in addition to method 900. These functions may involve the first media playback device, after broadcasting the second wake-up packet, exiting the active mode, and entering the standby mode. For example, the first zone player 400, after broadcasting second wake-up packet 1102 on network interface 402, may exit the active mode and enter the standby mode. Yet, further, in some embodiments, the first media playback device exits the active mode and enters the standby mode when certain conditions are met.

Consider method 1100 including blocks 1102, 1104, and 1106, any or all of which may be used in conjunction with method 900 such that blocks 1102-1106 occur before, after, or concurrently with any of blocks 902-906. For example, at block 1102 in FIG. 11, the first media playback device, after broadcasting the second wake-up packet, determines whether the first media playback device is forwarding playback packets to a second media playback device. Playback packets may be network packets containing audio signal data for playback on one or more audio playback devices in their payload. For example, the first zone player 400 may determine whether it is forwarding playback packets on network interface 402 to a second zone player 400.

In some embodiments, the first media playback device may determine whether the first media playback device is forwarding playback packets to a second media playback device by counting, for a predetermined period of time, the number of packets received during that period by the first media playback device. If the number of packets received during the period is more than a threshold, the first media playback device may determine that it is forwarding packets. For example, zone player 400 may count packets received on network interface 402 during a predetermined period of time.

Other methods of determining whether the first media playback device is forwarding playback packets are possible as well. Moreover, the determination of whether the first media playback device is forwarding playback packets may be repeated periodically to determine whether the forwarding of playback packets continues or whether forwarding has ended.

In some embodiments, additional actions based upon the determination of whether or not the first media playback device is forwarding playback packets to a second media device may be taken. Consider, at block 1104, when the first media playback device is not forwarding playback packets to the second media playback device, the first media playback device may exit the active mode and enter the standby mode. For example, the first zone player 400 may exit the active mode and enter the standby mode when the first zone player 400 is not forwarding packets on network interface 402. Or, at block 1106, when the first media playback device is forwarding playback packets to the second media playback device, the first media playback device may remain in the active mode. For example, first zone player 400 may remain in the active mode so that playback packets may be forwarded on network interface 402.

Moreover, method 1100 may be repeated for the additional media playback devices such that only a subset of media playback devices within the media playback system that are within a playback path remain in the active mode. For example, each media playback device 1206-1214 determines whether it is forwarding playback packets to at least one additional media playback device 1206-1214. If any media playback device 1206-1214 is not forwarding playback packets, then that media playback device 1206-1214 exits the active mode and enters the standby mode. In some embodiments, if any media playback device 1206-1214 is forwarding playback packets, then each media playback device 1206-1214 may remain in the active mode.

IX. Example Second Method for Media Playback Device Wake-Up

As discussed above, embodiments described herein may involve mechanisms to wake-up a media playback device from a standby mode using a network message known as a wake-up packet wherein the media playback device is interconnected with other media playback devices to form a networked media playback system. Further, as noted above, the wake-up packet may have various payloads depending on the media playback devices that are targeted by the wake-up packet. In some embodiments, the wake-up packet may have a unicast destination address in the payload. These embodiments may be used to wake a subset of media playback devices, such as a destination media playback device and additional media playback devices forming a playback path to the destination media playback device.

Figure 13:
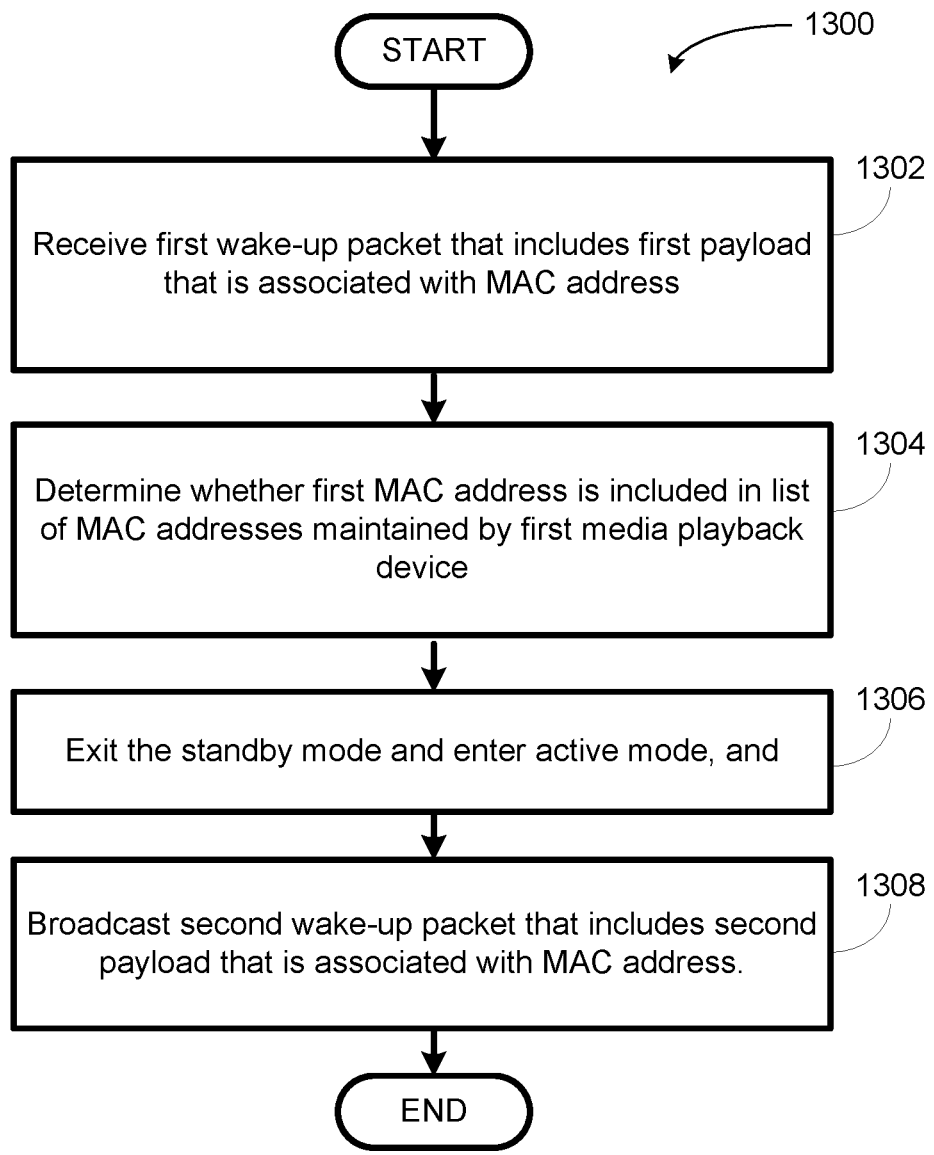
FIG. 13 shows an example flow diagram for waking media playback devices from a standby mode in a point-to-point network with a wake-up packet associated with a unicast destination MAC address.
Figure 15:
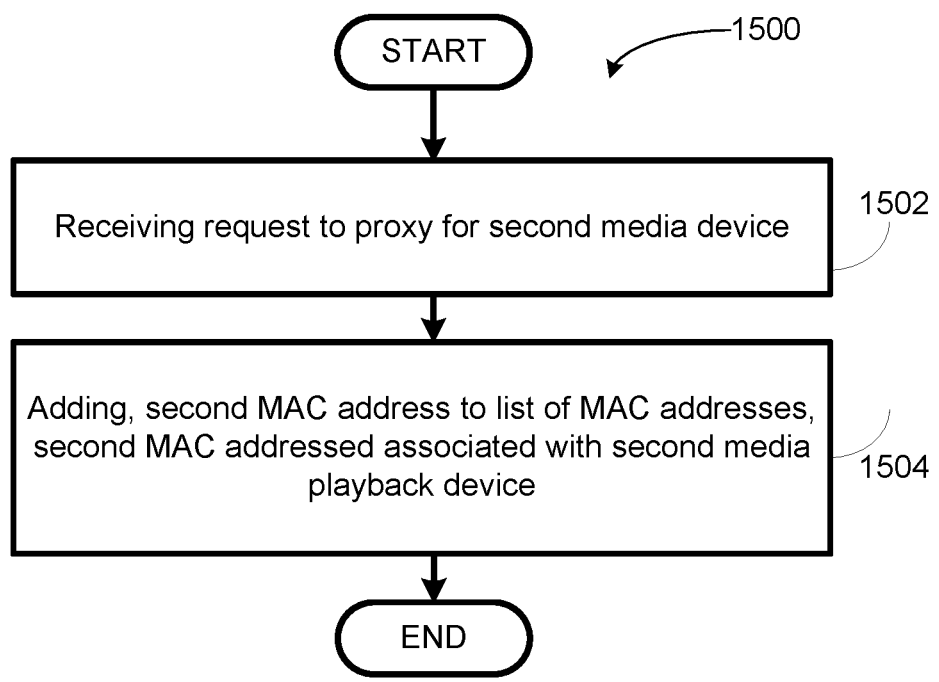
FIG. 15 shows an example flow diagram for adding media playback devices to a proxy list.

FIG. 13 shows an example flow diagram for waking media playback devices from standby mode using a wake-up packet including a unicast destination MAC address, in accordance with at least some embodiments described herein. Method 1300 shown in FIG. 1300 presents an embodiment of a method that could be used in the environments 100, 600, 700, 800, or 1200 with the systems 200, 202, 204, 300, 400, and 500 for example. FIG. 15 shows an example flow diagram presenting method 1500 for a media playback device to act as a proxy for additional media playback devices that may, in some embodiments, be used in conjunction with method 900 in the environments 100, 600, 700, 800, or 1200 with the systems 200, 202, 204, 300, 400, and 500 for example. For example, each of bocks 1302-1308 may be carried out before, after, or concurrently with each of blocks 1502-1504.

In some embodiments, two or more media playback devices may be interconnected in a network to form a media playback system. FIG. 12 shows example media playback devices and example controllers as part of a networked media playback system. As described above, in some embodiments, a networked media playback system may be configured in an ad-hoc (or mesh) network, such that each media playback device may participate in network routing with other media playback devices. The networked media playback system 1200 includes example media playback devices 1206, 1208, 1210, 1212, and 1214. The networked media playback system also includes example controllers 1216 and 1218 connected to wireless router 1204. The media playback devices 1206-1214 and the controllers 1216-1218 form a mesh network. The mesh network comprises point-to-point paths 1220-1228 between devices (e.g. the media playback devices and the wireless router device). Relative to the controllers 1216 and 1218, only media playback device 1206 has a direct route to the controllers because the wireless router broadcasts packets over its wired and wireless interfaces. Media playback devices 1208-1214 are connected to the controllers indirectly through at least one other media playback device (i.e., media playback device 1206).

As a general matter, each of blocks 1302-1308 and 1502-1504 may be carried out by one or more media playback devices. Media playback devices may include any one or more of zone players 102-124 of FIG. 1. Further, media playback devices may include any one or more of zone players 200, 202, and 204 of FIGS. 2A, 2B, and 2C, respectfully. Yet further, media playback devices may include any one or more of zone player 400 of FIG. 4 and zone players 612 and 614 of FIG. 6. In addition, media playback devices may also include any one or more of zone players 702-706 of FIG. 7 and/or playback devices 864 and 874 of FIG. 8. Further, media playback devices may include media playback devices 1206, 1208, 1210, 1212, or 1214 of FIG. 12. Other possibilities may also exist. It should be understood that media playback devices may be described herein as a "first media playback device", a "second media playback device", "at least one additional media playback device", and/or "a third media playback device" to distinguish one playback device from another.

Methods 1300 and 1500 may include one or more operations, functions, or actions as illustrated by one or more of blocks 1302-1308 and 1502-1504. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 1300, 1500, and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1200 and other processes and methods disclosed herein, each block in FIG. 12 may represent circuitry that is wired to perform the specific logical functions in the process.

a. Receiving, while the First Media Playback Device is in a Standby Mode, a First Wake-Up Packet At block 1302, the method 1300 may involve receiving, by a first media playback device, while the first media playback device is in a standby mode, a first wake-up packet that is that includes a first payload associated with a MAC address. As described above, a first media playback device may have a network interface. For example, a first media playback device might be a first zone player 400 of FIG. 4 that has a network interface 402. The first zone player 400 may receive a wake-up packet over wireless network interface 404 or wired network interface 406. In some embodiments, the wake-up packet may be received over either wireless network interface 404 or wired network interface 406. In other embodiments, the wake-up packet may be received over both wireless network interface 404 and wired network interface 406.

Figure 14:
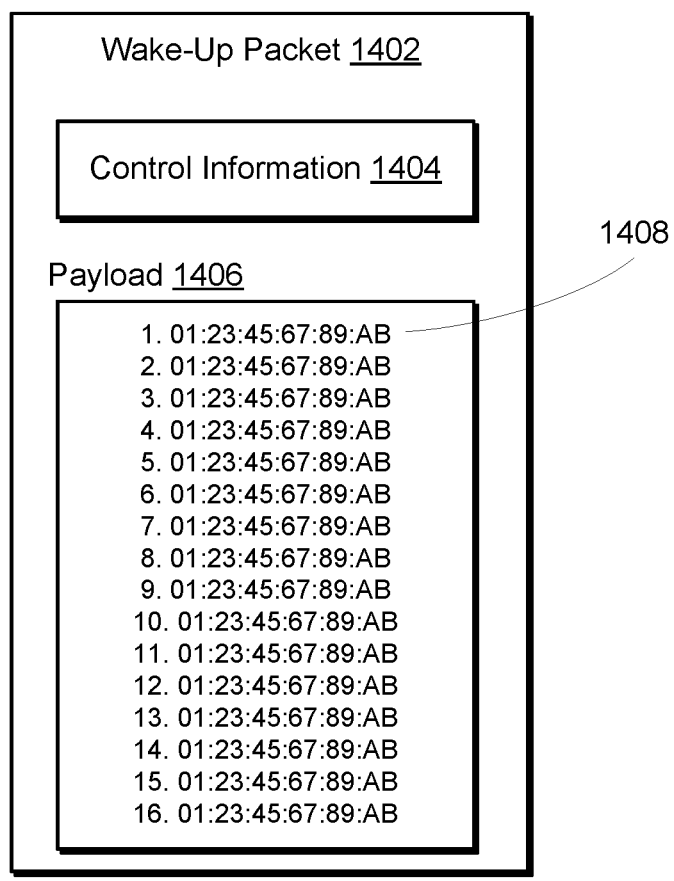
FIG. 14 shows an example illustration of a wake-up packet associated with a unicast destination MAC address.

The first wake-up packet includes a first payload that is associated with a MAC address. Consider FIG. 14 showing an example wake-up packet 1402 having control information 1404, a payload 1406, and a MAC address 1408 associated with the payload 1406. For example, first wake-up packet 1402 may include first payload 1406 associated with media access control (MAC) address 1408. The first wake-up packet 1402 may be a formatted unit of data carried by a packet-switched network, such as network 600 or Ad-Hoc network 700.

MAC address 1408 may be a unique identifier assigned to network interfaces for network communications. For example, wireless network interface 404 may have a unique MAC address to identify the wireless network interface 404 on network 710, 712, 850, or 860. The MAC address may conform to the IEEE 802 standard format having a 48-bit address space.

The first wake-up packet 1402 may have a first payload 1406 that includes a MAC address 1408. The first payload 1406 may include sixteen repetitions of a MAC address 1408. Sixteen repetitions of the MAC address 1408 may be recognized by the first media playback device as a signal to enter or exit a device mode, such as a standby mode. In some embodiments, the MAC address 1408 included in the payload may be a unicast destination address that refers to a media playback device. For example, the unicast destination address may refer to a network interface of a media playback device such as network interface 402 of zone player 400. In another example, the unicast destination address may refer to a network interface of media playback device 1206 in FIG. 12.

The control information 1404 may include, along with other information, a destination address. In some embodiments, the destination address may be the broadcast destination address. In some embodiments, the broadcast destination address may be the MAC address FF:FF:FF:FF:FF:FF, otherwise known as the "all F" address. In other embodiments, the destination address may be a unicast destination address that refers to a media playback device. For example, the unicast destination address may refer to a network interface of a media playback device such as network interface 402 of zone player 400. In another example, the unicast destination address may refer to a network interface of media playback device 1206 in FIG. 12.

In some embodiments, such as wherein a first media playback device and a second media playback device are interconnected to form a media playback system, a second media playback device may receive, by the second media playback device while the second media playback device is in standby mode, a second wake-up packet. For example, media playback device 1206 in FIG. 12 may receive a first wake-up packet 1402 and media playback device 1208 may receive a second wake-up packet 1402. In some embodiments, multiple media playback devices may receive additional wake-up packets 1402. For example, each of media playback devices 1206, 1208, 1210, 1212, and 1214 may receive a wake-up packet.

The first wake-up packet 1402 may be sent from any device within the network 710, 712, 850, or 860. For example, the first wake-up packet 1402 may be sent from controller 500 using network interface 508 when a user initiates the playback of an audio track using input interface 514. Or, the first wake-up packet 1402 may be sent from an additional zone player 400 using network interface 402. Alternatively, the wake-up packet 1402 may originate at a controller 500 and travel through one or more additional intermediary zone players 400 before being received by the first zone player 400.

In method 1400, the first media playback device may be configured to be initially in a standby mode. For example, the first zone player 400 may be configured to be in standby mode, e.g., before executing block 1402 in method 1400. For example, the first zone player 400 may be configured to be in standby mode. Or, media playback device 1206 may be in a standby mode. Standby mode may involve disabling one or more components of the media playback device. Further, standby mode may involve putting one or more components in a sleep mode, a standby mode, or the like. In some embodiments, standby mode may involve disabling one or more audio playback components. Standby mode may reduce overall power consumption by the first media playback device as compared to other device modes.

In some embodiments, such as wherein a first media playback device and a second media playback device are interconnected to form a media playback system, the second media playback device may be configured to be initially in a standby mode. For example, the first media playback device 1206 may be may be configured to be initially in a standby mode and the second media playback device 1208 may be configured to be initially in a standby mode.

In further embodiments, standby mode may involve one or more of the following: disabling an audio playback stage of the first media playback device; enabling a processor sleep mode for a processor of the first media playback device; or enabling a network interface sleep mode for at least one network interface of the first media playback device. For example, standby mode for zone player 400 might involve disabling audio stage 424 or components thereof, such as audio processing component 412 or audio amplifier 416. Standby mode for zone player 400 might additionally or alternatively involve enabling a sleep mode for processor 408 or network interface 402. Sleep mode for processor 408 may be, for example, a device mode in which the processor is not executing instructions. Sleep mode for network interface 402 may be, for example, a device mode in which the network interface is not actively communicating, but instead periodically checking for an incoming message, such as a wake-up packet 1402. Standby mode may reduce overall power consumption by the first media playback device as compared to other device modes.

b. Determining Whether the First MAC Address is Included in a List of MAC Addresses Maintained by the First Media Playback Device At block 1304, the method 1300 may involve determining whether the first MAC address is included in a list of MAC addresses maintained by the first media playback device. For example, first zone player 400 may determine whether MAC address 1408 in wake-up packet 1402 is included in a list of MAC addresses maintained by the first zone player 400. The list of MAC addresses may include the MAC address of the first media playback device along with any additional media playback devices. Referring to FIG. 12, media playback device 1206 may have a list of one or more MAC addresses where each MAC address corresponds to the network interface of media playback devices 1208-1214.

The first media playback device may determine whether the first MAC address is included in the list of MAC addresses maintained by the first media playback device using a plurality of embodiments. For example, the first media playback device may compare the first MAC address to each MAC address in the list of MAC addresses maintained by the first media playback device. Other embodiments not described here are contemplated as well.

In some embodiments, a second media playback device may determine whether the first MAC address is included in a list of MAC addresses maintained by the second media playback device. For example, media playback device 1206 in FIG. 12 may determine whether the first MAC address is included in a list of MAC addresses maintained by the first media playback device and media playback device 1208 may determine whether the first MAC address is included in a list of MAC addresses maintained by the second media playback device. In some embodiments, multiple media playback devices may determine whether the first MAC address is included in a list of MAC addresses maintained by the media playback device. For example, each of media playback devices 1206, 1208, 1210, 1212, and 1214 may determine whether the first MAC address is included in a list of MAC addresses maintained by each of media playback devices 1206, 1208, 1210, 1212 and 1214.

The list of MAC addresses may include the MAC addresses of additional media playback devices for which the first media playback device is acting as a proxy. Referring to FIG. 15, method 1500 shows an example flow diagram showing how MAC addresses could be added to the list of MAC addressees maintained by the first media playback device. At block 1502, method 1500 may involve the first media playback device receiving a request to proxy for a second media device. For example, this may involve a first zone player 400 receiving a request to proxy from a second zone player 400. In some embodiments, this request to proxy may be a network message or a series of network messages. As another example, referring to FIG. 12, media playback device 1208 may receive a request to proxy from media playback device 1212. In some embodiments, media playback device 1212 may send the request to proxy when it enters a device mode, such as standby mode.

At block 1504, method 1500 may further involve the first media device adding the second MAC address to the list of MAC addresses wherein the second MAC address is associated with the second media playback device. For example this may involve a first zone player 400 adding the MAC address of a second zone player 400 to the list of MAC addresses wherein the MAC address of the second zone player 400. As another example, media playback device 1208 may receive the request to proxy from media playback 1212 and add the MAC address of the network interface of media playback device 1212 to the list of MAC addresses maintained by media playback device 1208.

In some embodiments, additional functions may be performed in addition to method 1500. These functions may involve sending, to the first media playback device, a request to proxy for the second media device, wherein the request to proxy includes a second MAC address associated with the second media playback device and a third MAC address associated with a third media playback device, wherein the second media playback device is a proxy for the third media playback device. For example, media playback device 1208 may receive the request to proxy from media playback 1212 and add the MAC address of the network interface of media playback device 1212 to the list of MAC addresses maintained by media playback device 1208. If media playback device 1208 goes into standby mode, then it must send a request to proxy to media playback device 1206. However, since media playback device 1208 is already a proxy for media playback device 1212, the request to proxy sent by media playback device 1208 to media playback device 1206 may also include the MAC address of media playback 1212 in addition to the MAC address of media playback device 1208.

These functions may involve the first media playback device adding a third MAC addresses to the list of MAC addresses maintained by the first media playback device. For example, continuing the example above, when media playback device 1206 receives the request to proxy sent by media playback device 1208 to media playback device 1206 that may also include the MAC address of media playback 1212 in addition to the MAC address of media playback device 1208, media playback device 1206 may add the MAC address of media playback device 1212 to the list of MAC addresses maintained by media playback device 1206. In some embodiments, both the MAC address of media playback device 1208 and 1212 may be added to the list of MAC addresses maintained by media playback device 1206. Moreover, this process may be repeated for additional downstream media playback devices such as media playback devices 1210 and 1214 such that media playback device 1206 may have a list of MAC addresses corresponding to downstream devices for which it is acting as a proxy.

c. Exiting the Standby Mode and Entering an Active Mode

At block 1306, method 1300 may involve the first media playback device exiting the standby mode and entering an active mode when the first MAC address is included in the list of MAC addresses. For example, the first zone player 400 may exit the standby mode and enter the active mode when the first MAC address is included in the list of MAC addresses. Or, media playback device 1206 may exit the standby mode and enter the active mode when the first MAC address is included in the list of MAC addresses. Active mode may involve enabling one or more components of the media playback device. Further, active mode may involve taking one or more components out of a sleep mode, a standby mode, or the like. In some embodiments, active mode may involve enabling one or more audio playback components.

In some embodiments, such as wherein a first media playback device and a second media playback device are interconnected to form a media playback system, the second media playback device may exit the standby mode and enter the active mode when the first MAC address is included in the list of MAC addresses maintained by the second media playback device. For example, the second media playback device 1208 may exit the standby mode and enter the active mode when the first MAC address is included in the list of MAC addresses maintained by the second media playback device 1208.

In some embodiments, active mode may involve one or more of the following: enabling an audio playback stage of the first media playback device; disabling a processor sleep mode for a processor of the first media playback device; and disabling a network interface sleep mode for at least one network interface of the first media playback device. For example, active mode for zone player 400 might involve enabling audio stage 424 or components thereof, such as audio processing component 412 or audio amplifier 416. Additionally or alternatively, active mode for zone player 400 might involve disabling a sleep mode for processor 408 or network interface 402. Active mode might also be referred to as the normal operating mode for the first media playback device. In some embodiments, the first media playback device may consume more power in active mode as compared with at least one other device mode, such as standby mode.

d. Broadcasting a Second Wake-Up Packet that Includes a Second Payload that is Associated with a Unicast MAC Address At block 1308, method 1300 may involve, when the first MAC address is included in the list of MAC addresses, the first media playback device broadcasting a second wake-up packet that includes a second payload that is associated with the MAC address. In some embodiments, broadcasting the second wake-up packet may involve creating a second wake-up packet and transmitting the second wake-up packet on a network interface. For example, the first zone player 400 may create a second wake-up packet 1402 and transmit the second wake-up packet 1402 on network interface 402 using either wireless network interface 404 or wired interface 406. In some embodiments, the second wake-up packet 1402 may include the broadcast address as the destination address in the control information 1404. In other embodiments, the second wake-up packet 1402 may include a unicast destination address as the destination address in the control information 1404. Moreover, the second wake-up packet 1402 may include a second payload 1406 that includes the unicast destination MAC address 1408. In some embodiments, the second payload 1406 may have sixteen repetitions of the unicast destination MAC address 1408. In some embodiments, the payload 1406 may have other data in addition to the repetitions of a MAC address 1408.

As another example, media playback device 1206 in FIG. 12 may receive a first wake-up packet 1402, exit the standby mode, and broadcast a second wake-up packet 1402 when the first MAC address is included in the list of MAC addresses maintained by media playback device 1206. When the first media playback device 1206 is part of a media playback system 1200, the second wake-up packet 1402 may be received by one or more additional media playback devices. For example, after media playback device 1206 broadcasts the second wake-up packet 1402, media playback device 1208, may receive the second wake-up packet 1402. In response to receiving the second wake-up packet 1402, media playback device 1208 may exit standby mode and enter active mode, and broadcast a third wake-up packet 1402 when the second MAC address is included in the list of MAC addresses maintained by media playback device 1208. The third wake-up packet 1402 may include a third payload 1406 that is associated with a unicast MAC address 1408.

The method 1300 may be repeated at additional media playback devices within the media playback system until so as to cause additional media playback devices in the system to be woken up. For example, each of media playback devices 1206, 1208, 1210, 1212, and 1214 may receive a wake-up packet, exit standby mode and enter active mode, and broadcast a wake-up packet when the MAC address in the wake-up packet received by each respective media playback device 1206-1214 is included in the list of MAC addresses maintained by the respective media playback device 1206-1214.

Further, in some embodiments, the second payload 1406 included in the second wake-up packet 1402 may be the same payload 1406 as the first payload included in the first wake-up packet 1402. For example, the first zone player 400 may copy the first payload 1406 from the first wake-up packet 1402 to the second wake-up packet 1402. Or, the first zone player 400 may translate the information in the first payload 1406 from the first wake-up packet 1402 to the second payload 1406 in the second wake-up packet 1402.

Further, in some embodiments, the first wake-up packet may have a unicast destination address as its destination address in the control information. For example, first wake-up packet 1402 with control information 1404 that includes a unicast destination address as the destination address. In this embodiment, the unicast destination address is translated from the control information 1404 in the first wake-up packet 1402 to the control information 1404 in the second wake-up packet. The second wake-up packet is sent as a unicast message to the destination media playback device or to the next intermediary device that is acting as a proxy for the destination media playback device.

Further, in some embodiments, additional functions may be carried out in addition to method 1300. These functions may involve the first media playback device remaining in the standby mode when the first MAC address is not included in the list of MAC addresses. In this embodiment, the first MAC address 1408 is not associated with the MAC address of the first media playback or any device that the first media playback device for which the first media playback device may be acting as a proxy.

In some embodiments, as described above, two or more media playback devices may be interconnected in a network to form a media playback system. Moreover, as described above, the first media playback device may carry out the steps of method 1300. For example, referring to FIG. 12, media playback device 1206 may receive a first wake-up packet 1402, determine that the first MAC address is included in the list of MAC addresses, exit the standby mode, and broadcast a second wake-up packet 1402. When the first media playback device 1206 is part of a media playback system 1200, the second wake-up packet 1402 may be received by one or more additional media playback devices. For example, after media playback device 1206 broadcasts the second wake-up packet 1402, media playback device 1208, may receive the second wake-up packet 1402. In response to receiving the second wake-up packet 1402, media playback device 1208 may determine that the first MAC address is included in the list of MAC addresses, exit the standby mode, and broadcast a third wake-up packet 1402. The third wake-up packet 1402 may include a third payload 1406 that is associated with the unicast MAC address 1408. In some embodiments, the third payload 1406 may be the same as the first payload 1406 and the second payload 1406. However, in other embodiments, the third payload may be associated with the same MAC broadcast address 1408 as the first payload 1406 and the second payload 1406, but contain additional data in the third payload 1406.

The method 1300 may be repeated at additional media playback devices within the media playback system until all media playback devices in the system are woken up. For example, each of media playback devices 1206, 1208, 1210, 1212, and 1214 may receive a wake-up packet, and determine whether the MAC address in the wake-up packet is within the list of MAC addresses maintained by the respective media playback device. Upon making the determination that the MAC address in the wake-up packet is within the list of MAC addresses, each media playback device 1206, 1208, 1210, 1212, and 1214 may exit standby mode and enter active mode and broadcast a wake-up packet. In some embodiments, when the MAC address in the wake-up packet is within not the list of MAC addresses maintained by the each media playback device, the media playback device remains in the standby mode.

X. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves mechanisms to wake-up a media playback device from a standby mode using a network message known as a wake-up packet, wherein the media playback device is interconnected with other media playback devices to form a networked media playback system. In one aspect, a method is provided. The method involves receiving, by a first media playback device, while the first media playback device is in a standby mode, a first wake-up packet that includes a first payload that is associated with a MAC broadcast address. In response to receiving the first wake-up packet, the method further involves exiting, by the first media playback device, the standby mode and entering an active mode, and broadcasting, by the first media playback device a second wake-up packet that includes a second payload that is associated with the MAC broadcast address.

In another aspect, a non-transitory computer readable memory is provided. The non-transitory computer-readable storage medium includes a set of instructions for execution by a processor. The set of instructions, when executed, cause a first media playback device to receive, by a first media playback device, while the first media playback device is in a standby mode, a first wake-up packet that includes a first payload that is associated with a MAC broadcast address. In response to receiving the first wake-up packet, the set of instructions, when executed, further cause the first media playback device to exit, by the first media playback device, the standby mode, and enter an active mode; and broadcast, by the first media playback device, a second wake-up packet that includes a second payload that is associated with the MAC broadcast address.

In a further aspect, a media playback device is provided. The device includes a network interface, a processor, a data storage, and a program logic stored in the data storage and executable by the processor to receive, by the first media playback device, while the media playback device is in a standby mode, a first wake-up packet that includes a first payload that is associated with a MAC broadcast address. In response to receiving the first wake-up packet, the program logic is further executable by the processor to exit, by the first media playback device, the standby mode and enter an active mode, and broadcast, by the first media playback device, a second wake-up packet that includes a second payload that is associated with the MAC broadcast address.

In yet another aspect, a media playback system is provided. The system includes a first media playback device and a second media playback device. The first media playback device includes a network interface, a processor, a data storage and executable by the processor to receive, by the first media playback device, while the media playback device is in a standby mode, a first wake-up packet that includes a first payload that is associated with a MAC broadcast address. In response to receiving the first wake-up packet, the program logic is further executable by the processor to exit, by the first media playback device, the standby mode and enter an active mode, and broadcast, by the first media playback device, a second wake-up packet that includes a second payload that is associated with the MAC broadcast address.

In another aspect, a method is provided in a local area network comprising a plurality of devices, including at least a first media playback device and a second media playback device. The method includes receiving, by a first media playback device, while the first media playback device is in a standby mode, a first wake-up packet that includes a first payload that is associated with a first MAC address. In response to receiving the first wake-up packet, the method further includes determining, by the first media playback device, whether the first MAC address is included in a list of MAC addresses maintained by the first media playback device. When the first MAC address is included in the list of MAC addresses, the method further includes exiting, by the first media playback device, the standby mode, and entering an active mode, and broadcasting, by the first media playback device, a second wake-up packet that includes a second payload that is associated with the first MAC address.

In a further aspect, a non-transitory computer readable memory is provided. The non-transitory computer-readable storage medium includes a set of instructions for execution by a processor. The set of instructions, when executed, cause a first media playback device to receive, by a first media playback device while the first media playback device is in standby mode, a first wake-up packet that includes a first payload that is associated with a first MAC address. In response to receiving the first wake-up packet, the set of instructions further cause the first media playback device to determine, by the first media playback device, whether the first MAC address is included in a list of MAC addresses maintained by the first media playback device. When the first MAC address is included in the list of MAC addresses, the set of instructions further cause the first media playback device to exit, by the first media playback device, the standby mode and enter an active mode, and broadcast, by the first media playback device, a second wake-up packet that includes a second payload that is associated with the first MAC address.

In yet another aspect, a media playback device is provided. The device includes a network interface, a processor, a data storage, and a program logic stored in the data storage and executable by the processor to receive, by the first media playback device is in standby mode, a first wake-up packet that includes a first payload that is associated with a first MAC address. In response to receiving the first wake-up packet, the program logic is further executable by the processor to determine, by the first media playback device, whether the first MAC address is included in a list of MAC addresses maintained by the first media playback device. When the first MAC address is included in the list of MAC addresses, the program logic is further executable by the processor to exit, by the first media playback device, the standby mode and enter an active mode, and broadcast, by the first media playback device, a second wake-up packet that includes a second payload that is associated with the MAC address.

In a further aspect, a media playback system is provided. The system includes a first media playback device and a second media playback device. The first media playback device includes a network interface, a processor, a data storage and executable by the processor to receive, by the first media playback device is in standby mode, a first wake-up packet that includes a first payload that is associated with a first MAC address. In response to receiving the first wake-up packet, the program logic is further executable by the processor to determine, by the first media playback device, whether the first MAC address is included in a list of MAC addresses maintained by the first media playback device. When the first MAC address is included in the list of MAC addresses, the program logic is further executable by the processor to exit, by the first media playback device, the standby mode and enter an active mode, and broadcast, by the first media playback device, a second wake-up packet that includes a second payload that is associated with the MAC broadcast address.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A first playback device comprising:
a communications interface;
one or more processors;
an audio amplifier; and
at least one non-transitory computer-readable medium comprising program instructions that are executable by the one or more processors such that the first playback device is configured to:
operate in a first mode, wherein the audio amplifier consumes less power while the first playback device is in the first mode than in a second mode;
while operating in the first mode, receive, via the communications interface, a first wake-up packet;
based on receiving the first wake-up packet, exit the first mode and enter the second mode, wherein the program instructions that are executable by the one or more processors such that the first playback device is configured to enter the second mode comprise program instructions that are executable by the one or more processors such that the first playback device is configured to enable the audio amplifier of the first playback device;
while operating in the second mode, (i) receive, via the communications interface, an audio stream comprising audio content, (ii) cause a second wake-up packet to be sent to a second playback device and thereby cause the second playback device to exit a respective first mode and enter a respective second mode, wherein a respective audio amplifier of the second playback device consumes less power while the second playback device is in the first mode than in the second mode, (iii) begin forwarding, via the communications interface, the audio content to the second playback device, and (iv) play back, via the audio amplifier, the audio content in synchrony with the second playback device;
cease forwarding the audio content to the second playback device; and
after the cessation of forwarding the audio content to the second playback device, exit the second mode and enter the first mode.

2. The first playback device of claim 1, wherein the at least one non-transitory computer-readable medium further comprises program instructions that are executable by the one or more processors such that the first playback device is configured to:
synchronize, via the communications interface, the playback of the audio content in a group with the second playback device.

3. The first playback device of claim 1, wherein the program instructions that are executable by the one or more processors such that the first playback device is configured to play back the audio content in synchrony with the second playback device comprise program instructions that are executable by the one or more processors such that the first playback device is configured to:
play back the audio content in synchrony with the second playback device and at least one additional playback device.

4. The first playback device of claim 1, wherein the program instructions that are executable by the one or more processors such that the first playback device is configured to play back the audio content in synchrony with the second playback device comprise program instructions that are executable by the one or more processors such that the first playback device is configured to:
play back at least one first channel of the audio content in synchrony with playback of at least one second channel of the audio content by the second playback device.

5. The first playback device of claim 1, wherein the program instructions that are executable by the one or more processors such that the first playback device is configured to enter the first mode comprise program instructions that are executable by the one or more processors such that the first playback device is configured to:
disable the audio amplifier.

6. The first playback device of claim 1, wherein the program instructions that are executable by the one or more processors such that the first playback device is configured to cause the first playback device to enter the first mode comprise program instructions that are executable by the one or more processors such that the first playback device is configured to:
cause at least one processor of the one or more processors to enable a sleep mode.

7. The first playback device of claim 1, wherein the at least one non-transitory computer-readable medium further comprises program instructions that are executable by the one or more processors such that the first playback device is configured to:
determine that the first playback device has ceased forwarding the audio content for a pre-determined period of time, wherein the program instructions that are executable by the one or more processors such that the first playback device is configured to exit the second mode and enter the first mode comprise program instructions that are executable by the one or more processors such that the first playback device is configured to exit the second mode and enter the first mode based on the determination.

8. A system comprising a first playback device and a second playback device, the first playback device comprising:
a first communications interface;
one or more first processors;
a first audio amplifier; and
at least one first non-transitory computer-readable medium comprising first program instructions that are executable by the one or more first processors such that the first playback device is configured to:
operate in a first mode, wherein the first audio amplifier consumes less power while the first playback device is in the first mode than in a second mode;
while operating in the first mode, receive, via the first communications interface, a first wake-up packet;
based on receiving the first wake-up packet, exit the first mode and enter the second mode, wherein the program instructions that are executable by the one or more first processors such that the first playback device is configured to enter the second mode comprise program instructions that are executable by the one or more first processors such that the first playback device is configured to enable the first audio amplifier of the first playback device;

while operating in the second mode, (i) receive, via the first communications interface, an audio stream comprising audio content, (ii) cause a second wake-up packet to be sent to the second playback device and thereby cause the second playback device to exit a respective first mode and enter a respective second mode, wherein a respective audio amplifier of the second playback device consumes less power while the second playback device is in the first mode than in the second mode, (iii) begin forwarding, via the first communications interface, the audio content to the second playback device, and (iv) play back, via the first audio amplifier, the audio content in synchrony with the second playback device;

cease forwarding the audio content to the second playback device; and after the cessation of forwarding the audio content to the second playback device, exit the second mode and enter the first mode; and wherein the second playback device comprises:
a second communications interface;
one or more second processors;
a second audio amplifier; and
at least one second non-transitory computer-readable medium comprising second program instructions that are executable by the one or more second processors such that the second playback device is configured to:
play back, via the second audio amplifier, the audio content in synchrony with the first playback device.

9. The system of claim 8, wherein the at least one first non-transitory computer-readable medium further comprises first program instructions that are executable by the one or more first processors such that the first playback device is configured to:
synchronize, via the first communications interface, the playback of the audio content in a group with the second playback device.

10. The system of claim 8, wherein the first program instructions that are executable by the one or more first processors such that the first playback device is configured to play back the audio content in synchrony with the second playback device comprise first program instructions that are executable by the one or more first processors such that the first playback device is configured to:
play back the audio content in synchrony with the second playback device and at least one additional playback device.

11. The system of claim 8, wherein the first program instructions that are executable by the one or more first processors such that the first playback device is configured to play back the audio content in synchrony with the second playback device comprise first program instructions that are executable by the one or more first processors such that the first playback device is configured to:
play back at least one first channel of the audio content in synchrony with playback of at least one second channel of the audio content by the second playback device.

12. The system of claim 8, wherein the first program instructions that are executable by the one or more first processors such that the first playback device is configured to enter the first mode comprise first program instructions that are executable by the one or more first processors such that the first playback device is configured to:
disable the first audio amplifier.

13. The system of claim 8, wherein the first program instructions that are executable by the one or more first processors such that the first playback device is configured to enter the first mode comprise program instructions that are executable by the one or more first processors such that the first playback device is configured to:
cause at least one first processor of the one or more first processors to enable a sleep mode.

14. The system of claim 8, wherein the at least one first non-transitory computer-readable medium further comprises first program instructions that are executable by the one or more first processors such that the first playback device is configured to:
determine that the first playback device has ceased forwarding the audio content for a pre-determined period of time, wherein the first program instructions that are executable by the one or more first processors such that the first playback device is configured to exit the second mode and enter the first mode comprise first program instructions that are executable by the one or more first processors such that the first playback device is configured to exit the second mode and enter the first mode based on the determination.

15. The system of claim 8, wherein the at least one second non-transitory computer-readable medium further comprises second program instructions that are executable by the one or more second processors such that the second playback device is configured to:
after receiving the audio content, determine that the first playback device is no longer forwarding the audio content; and
after the determination, exit the second mode and enter the first mode, wherein the program instructions that are executable by the one or more second processors such that the second playback device is configured to enter the first mode comprise program instructions that are executable by the one or more second processors such that the second playback device is configured to disable the second audio amplifier of the second playback device.

16. A method to be performed by a first playback device, the method comprising:
operating in a first mode, wherein an audio amplifier of the first playback device consumes less power while the first playback device is in the first mode than in a second mode;
while operating in the first mode, receiving, via a communications interface of the first playback device, a first wake-up packet;
based on receiving the first wake-up packet, exiting the first mode and entering the second mode, wherein entering the second mode comprises enabling the audio amplifier of the first playback device;
while operating in the second mode, (i) receiving, via the communications interface, an audio stream comprising audio content, (ii) causing a second wake-up packet to be sent to a second playback device and thereby causing the second playback device to exit a respective first mode and enter a respective second mode, wherein a respective audio amplifier of the second playback device consumes less power while the second playback device is in the first mode than in the second mode, (iii) begin forwarding, via the communications interface, the audio content to the second playback device, and (iv) playing back, via the audio amplifier, the audio content in synchrony with the second playback device;

ceasing forwarding the audio content to the second playback device; and after the ceasing of forwarding the audio content to the second playback device, causing the first playback device to exit the second mode and enter the first mode.

17. The method of claim 16, further comprising:

synchronizing, via the communications interface, the playback of the audio content in a group with the second playback device.

18. The method of claim 16, wherein playing back the audio content in synchrony with the second playback device comprises:

playing back the audio content in synchrony with the second playback device and at least one additional playback device.

19. The method of claim 16, wherein playing back the audio content in synchrony with the second playback device comprises:

playing back at least one first channel of the audio content in synchrony with playback of at least one second channel of the audio content by the second playback device.

20. The method of claim 16, wherein entering the first mode comprises:

causing at least one processor of one or more processors of the first playback device to enable a sleep mode.

\* \* \* \* \*